US012722958B2

(12) United States Patent
Hoover

(10) Patent No.: US 12,722,958 B2
(45) Date of Patent: Sep. 1, 2026

(54) AERIAL WORK PLATFORM SYSTEM

(71) Applicant: Oshkosh Corporation, Oshkosh, WI (US)

(72) Inventor: Nathaniel Jacob Hoover, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 719 days.

(21) Appl. No.: 18/111,226

(22) Filed: Feb. 17, 2023

(65) Prior Publication Data

US 2023/0264937 A1 Aug. 24, 2023

Related U.S. Application Data

(60) Provisional application No. 63/311,734, filed on Feb. 18, 2022.

(51) Int. Cl.

| | |
|---|---|
| ***B66F 11/04*** | (2006.01) |
| ***B66F 9/12*** | (2006.01) |
| ***B66F 17/00*** | (2006.01) |

(52) U.S. Cl.
CPC ............ *B66F 11/046* (2013.01); *B66F 9/127* (2013.01); *B66F 17/006* (2013.01)

(58) Field of Classification Search
CPC ...... B66F 11/044; B66F 11/046; B66F 17/00; B66F 17/003; B66F 17/006; B66F 9/127
See application file for complete search history.

(56) References Cited

U.S. PATENT DOCUMENTS

| | | | | |
|---|---|---|---|---|
| 3,016,973 A * | 1/1962 | Williamson | B66F 9/07572 | 182/69.6 |
| 3,889,833 A * | 6/1975 | Thomas | B66F 9/127 | 414/785 |
| 4,185,716 A * | 1/1980 | Rinehart | B66F 11/044 | 182/2.5 |
| 5,044,472 A * | 9/1991 | Dammeyer | B66F 9/07545 | 414/630 |
| 5,555,953 A * | 9/1996 | Henderson | B66F 11/044 | 182/148 |
| 5,995,001 A * | 11/1999 | Wellman | B66F 17/003 | 340/685 |
| 6,152,264 A * | 11/2000 | Gaines, Sr. | B66F 11/046 | 182/2.1 |
| 6,265,983 B1 * | 7/2001 | Baillargeon | B66F 11/044 | 340/687 |
| 6,783,315 B1 * | 8/2004 | Senechal | B60R 9/0426 | 224/524 |
| 8,800,717 B2 * | 8/2014 | Berry, Jr. | B60R 3/005 | 182/113 |
| 9,114,967 B2 * | 8/2015 | Lombardi | E04G 1/22 | |
| 9,327,952 B1 * | 5/2016 | Kolharkar | B65G 1/0435 | |
| 9,890,024 B2 * | 2/2018 | Hao | B66F 9/065 | |
| 9,976,715 B2 * | 5/2018 | Walker | B66F 11/046 | |
| 10,138,102 B2 * | 11/2018 | Baillargeon | B66F 17/006 | |
| 10,329,129 B2 * | 6/2019 | Rodenburg | B66F 9/18 | |

(Continued)

*Primary Examiner* — Colleen M Chavchavadze
(74) *Attorney, Agent, or Firm* — Foley & Lardner LLP

(57) ABSTRACT

A lift device includes a chassis, a primary platform defining a first support surface configured to support an operator, a lift assembly coupling the primary platform to the chassis and configured to raise the primary platform relative to the chassis, and a secondary platform defining a second support surface and removably coupled to the primary platform.

15 Claims, 33 Drawing Sheets

(56) References Cited

U.S. PATENT DOCUMENTS

| | | | | |
|---|---|---|---|---|
| 10,570,001 | B2 * | 2/2020 | Yahner | B66F 9/0755 |
| 2002/0021956 | A1 * | 2/2002 | Winkler | B65G 1/1375<br>414/349 |
| 2007/0074935 | A1 * | 4/2007 | Zahn | B66F 9/07545<br>182/113 |
| 2017/0001846 | A1 * | 1/2017 | Paavolainen | B66F 9/07581 |
| 2017/0015537 | A1 * | 1/2017 | Bosworth, III | B66F 9/0755 |
| 2017/0233232 | A1 * | 8/2017 | Davis | B66F 11/042<br>182/69.5 |
| 2019/0225471 | A1 * | 7/2019 | Luminet | B60Q 9/00 |
| 2022/0134149 | A1 * | 5/2022 | Carlson | F16P 3/08<br>340/573.1 |

* cited by examiner

700

700

700

700

AERIAL WORK PLATFORM SYSTEM

CROSS-REFERENCE TO RELATED PATENT APPLICATION

This application claims the benefit of and priority to U.S. Provisional Application No. 63/311,734, filed on Feb. 18, 2022, the entire disclosure of which is hereby incorporated by reference herein.

BACKGROUND

Aerial work platforms, such as boom lifts, include a platform assembly that is designed to support people and/or objects so that tasks can be performed at different heights relative to the ground below. In some instances, an operator of the aerial work platform may need to exit the platform assembly to perform a task, which can be difficult and inefficient.

SUMMARY

One exemplary embodiment relates to a lift device. The lift device includes a chassis, a primary platform defining a first support surface configured to support an operator, a lift assembly coupling the primary platform to the chassis and configured to raise the primary platform relative to the chassis, and a secondary platform defining a second support surface and removably coupled to the primary platform.

Another exemplary embodiment relates to a removable platform system for a lift device including a platform configured to be removably coupled to the lift device and a locker assembly. The platform includes a base defining a horizontal support surface, a guardrail coupled to the base and extending above the horizontal support surface, the guardrail defining an opening through which the horizontal support surface can be accessed, and a door coupled to the guardrail and repositionable to selectively extend across the opening. The locker assembly includes a base panel, a rear panel coupled to the base panel, a pair of door panels each pivotally coupled to the rear panel and rotatable relative to the rear panel between an open position and a closed position, and a lock configured to secure the door panels in the closed positions and configured to permit movement of the door panels to the open positions in response to receiving a verified credential. When the door panels are in the closed positions, the door panels, the rear panel, and the base panel form an enclosure sized to contain the platform.

Another exemplary embodiment relates to a boom lift. The boom lift includes a chassis, a tractive element coupled to the chassis, a drive motor coupled to the chassis and configured to drive the tractive element to propel the boom lift, a boom assembly coupled to the chassis, the boom assembly including a boom actuator configured to raise a distal end of the boom assembly relative to the chassis, a primary platform coupled to the distal end of the boom assembly, and secondary platform removably coupled to the primary platform. The primary platform includes a base, a rear guardrail coupled to the base, a pair of side guardrails defining a first opening therebetween, the first opening being positioned opposite the rear guardrail, a first user interface coupled to the rear guardrail and configured to control operation of the drive motor and the boom actuator, and a second user interface coupled to at least one of the side guardrails and configured to control operation of the boom actuator. The secondary platform includes an implement at least one of electrically or hydraulically coupled to the primary platform.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
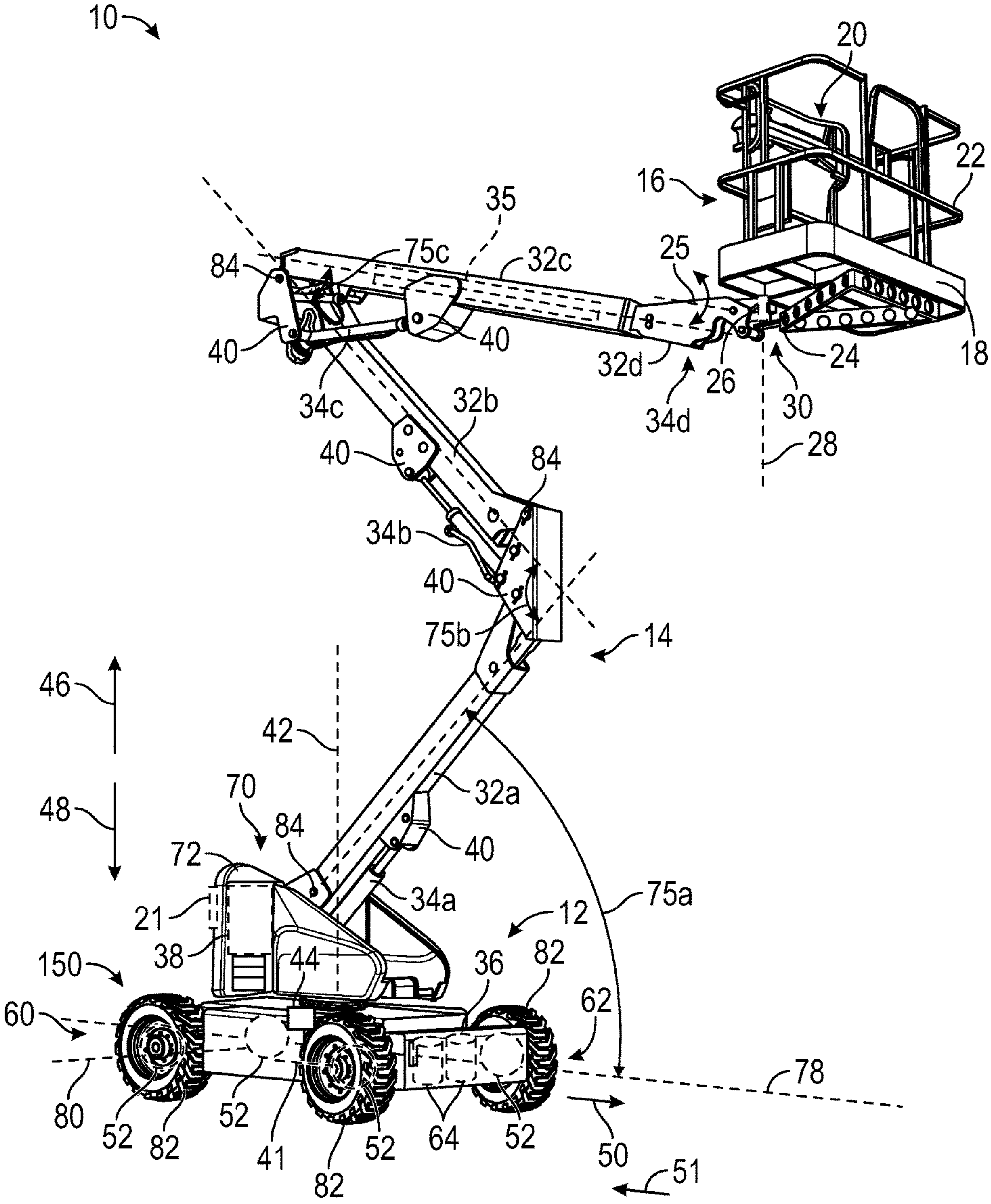
FIG. 1 is a front perspective view of a boom lift, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to aerial work platforms, such as boom lifts, that are operable using a customizable and exchangeable platform assembly. The aerial work platforms (AWPs) generally include a primary platform assembly that is coupled to a lifting mechanism (e.g., a boom, scissor mechanism, etc.). The primary platform assembly includes a quick-attach coupling mechanism that is configured to engage with and lock onto various different types of secondary platform assemblies that can be used to perform a variety of different tasks. The coupling mechanism can automatically position the primary platform assembly, using the lifting mechanism, in a position so that a robust yet removable coupling is formed between the primary platform assembly and the secondary platform assembly, such that the lifting mechanism is then configured to transport each of the primary platform assembly and the secondary platform assembly simultaneously.

The quick-attach coupling mechanism allows the AWP to efficiently perform a number of tasks that are normally difficult or time consuming to execute with traditional AWPs. For example, the use of a secondary platform assembly as a material handler can allow the AWP to easily place tools or materials at an elevated jobsite without needing an operator to leave the platform assembly. Similarly, the secondary platform assembly can support tool assemblies that can be used for specific tasks at height. Finally, the ability to quickly exchange secondary platform assemblies on the same AWP allows for customization and optimization at a jobsite. For example, several secondary platform assemblies can be pre-packaged with tools specific for a job to be performed that day, which can increase efficiency at a jobsite. Similarly, secondary platform assemblies can be tailored for specific tasks, generally, so that tools and other items do not need to be removed or exchanged from the secondary platform assembly before performing a new task. Instead, the primary platform assembly can decouple from one secondary platform assembly so that a second, entirely pre-packed secondary platform assembly can be coupled with the primary platform assembly to perform a new task. Accordingly, the operator using the AWP can continue performing tasks with the AWP efficiently, without needing to even leave the primary platform assembly. Likewise, exchangeable secondary platform assemblies allow a customer to design secondary platform assemblies specifically for their jobsites and specifically for accomplishing commonly-performed tasks.

Referring to FIG. 1, a lifting apparatus, a telehandler, boom lift, electric boom lift, a towable boom lift, a lift device, a fully electric boom lift, etc., shown as boom 10 includes a base assembly 12 (e.g., a support assembly, a drivable support assembly, a support structure, a chassis, etc.), a platform assembly 16 (e.g., a platform, a terrace, etc.), and a lift assembly 14 (e.g., a boom lift assembly, a lifting apparatus, an articulated arm, a scissor lift, etc.). The boom 10 includes a front end (e.g., a forward facing end, a front portion, a front, etc.), shown as front 62, and a rear end (e.g., a rearward facing end, a back portion, a back, a rear, etc.,) shown as rear 60. The lift assembly 14 is configured to elevate the platform assembly 16 in an upwards direction 46 relative to the base assembly 12. The lift assembly 14 is also configured to translate the platform assembly 16 in a downwards direction 48. The lift assembly 14 is also configured to translate or propel the platform assembly 16 in either a forwards direction 50 or a rearwards direction 51. The lift assembly 14 generally facilitates performing a lifting function to raise and lower platform assembly 16, as well as movement of the platform assembly 16 in various directions.

The base assembly 12 defines a longitudinal axis 78 and a lateral axis 80. The longitudinal axis 78 define the forward direction 50 of boom 10 and the rearward direction 51. The boom 10 is configured to translate in the forward direction 50 and to translate backwards in the rearward direction 51. The base assembly 12 includes one or more wheels, tires, wheel assemblies, tractive elements, rotary elements, treads, etc., shown as tractive elements 82. The tractive elements 82 are configured to rotate to drive (e.g., translate, steer, move, etc.) the boom 10. The tractive elements 82 can each include an electric motor 52 (e.g., electric wheel motors) configured to drive the tractive elements 82 (e.g., to rotate tractive elements 82 to facilitation motion of the boom 10). In other embodiments, the tractive elements 82 are configured to receive power (e.g., rotational mechanical energy) from electric motors 52 or through a drive train (e.g., a combination of any number and configuration of a shaft, an axle, a gear reduction, a gear train, a transmission, etc.). In some embodiments, one or more tractive elements 82 are driven by a prime mover through a transmission. The tractive elements 82 and electric motors 52 (or prime mover) can facilitate a driving and/or steering function of the boom 10.

The platform assembly 16 is configured to provide a work area for an operator of the boom 10 to stand/rest upon. The platform assembly 16 can be pivotally coupled to an upper end of the lift assembly 14. The boom 10 is configured to facilitate the operator accessing various elevated areas (e.g., lights, platforms, the sides of buildings, building scaffolding, trees, power lines, etc.). The boom 10 uses various electrically powered motors and electrically powered linear actuators or hydraulic cylinders to facilitate elevation of the platform assembly 16 (e.g., relative to the base assembly 12, or to a ground surface that the base assembly 12 rests upon).

The platform assembly 16 includes a base member, a base portion, a platform, a standing surface, a shelf, a work platform, a floor, a deck, etc., shown as a deck 18. The deck 18 provides a space (e.g., a floor surface) for a worker to stand upon as the platform assembly 16 is raised and lowered.

The platform assembly 16 includes various members, beams, bars, guard rails, rails, railings, etc., shown as rails 22. The rails 22 extend along substantially an entire perimeter of the deck 18. The rails 22 provide one or more members for the operator of the boom 10 to grasp while using the boom 10 (e.g., to grasp while operating the boom 10 to elevate the platform assembly 16). The rails 22 can include members that are substantially horizontal to the deck 18. The rails 22 can also include vertical structural members that couple with the substantially horizontal members. The vertical structural members can extend upwards from the deck 18.

The platform assembly 16 can include a human machine interface (HMI) (e.g., a user interface), shown as the HMI 20. The HMI 20 is configured to receive user inputs from the operator at or upon the platform assembly 16 to facilitate operation of the boom 10. The HMI 20 can include any number of buttons, levers, switches, keys, etc., or any other user input device configured to receive a user input to operate the boom 10 and/or output device configured to provide information to the user. The HMI 20 can be supported by one or more of the rails 22. The HMI 20 is described in additional detail below.

The platform assembly 16 includes a frame 24 (e.g., structural members, support beams, a body, a structure, etc.) that extends at least partially below the deck 18. The frame 24 can be integrally formed with the deck 18. The frame 24 is configured to provide structural support for the deck 18 of the platform assembly 16. The frame 24 can include any number of structural members (e.g., beams, bars, I-beams, etc.) to support the deck 18. The frame 24 couples the platform assembly 16 with the lift assembly 14. The frame 24 may be rotatably or pivotally coupled with the lift assembly 14 to facilitate rotation of the platform assembly 16 about an axis 28 (e.g., a centerline). The frame 24 can also rotatably/pivotally couple with the lift assembly 14 such that the frame 24 and the platform assembly 16 can pivot about an axis 25 (e.g., a centerline).

The lift assembly 14 includes one or more beams, articulated arms, bars, booms, arms, support members, boom sections, cantilever beams, etc., shown as lift arms 32. The lift arms 32 are hingedly or rotatably coupled with each other at their ends. The lift arms 32 can be hingedly or rotatably coupled to facilitate articulation of the lift assembly 14 and raising/lowering of the platform assembly 16. The boom 10 includes a lower lift arm 32*a*, a central or medial lift arm 32*b*, and an upper lift arm 32*c*. The lower lift arm 32*a* is configured to hingedly or rotatably couple at one end with the base assembly 12 to facilitate lifting (e.g., elevation) of the platform assembly 16. The lower lift arm 32*a* is configured to hingedly or rotatably couple at an opposite end with the medial lift arm 32*b*. Likewise, the medial lift arm 32*b* is configured to hingedly or rotatably couple with the upper lift arm 32*c*. The upper lift arm 32*c* can be configured to hingedly interface/couple and/or telescope with an intermediate lift arm 32*d*. The upper lift arm 32*c* can be referred to as "the jib" of the electric boom 10. The intermediate lift arm 32*d* may extend into an inner volume of the upper lift arm 32*c* and extend and/or retract. The lower lift arm 32*a* and the medial lift arm 32*b* may be referred to as "the boom" of the overall boom 10 assembly. The intermediate lift arm 32*d* can be configured to couple (e.g., rotatably, hingedly, etc.), with the platform assembly 16 to facilitate levelling of the platform assembly 16.

The lift arms 32 are driven to hinge or rotate relative to each other by actuators 34 (e.g., electric linear actuators, linear electric arm actuators, hydraulic cylinders, etc.). The actuators 34 can be mounted between adjacent lift arms 32 to drive adjacent lift arms 32 to hinge or pivot (e.g., rotate some angular amount) relative to each other about pivot points 84. The actuators 34 can be mounted between adjacent lift arms 32 using any of a foot bracket, a flange bracket, a clevis bracket, a trunnion bracket, etc. The actuators 34 are configured to extend or retract (e.g., increase in overall length, or decrease in overall length) to facilitate pivoting adjacent lift arms 32 to pivot/hinge relative to each other, thereby articulating the lift arms 32 and raising or lowering the platform assembly 16.

The actuators 34 can be configured to extend (e.g., increase in length) to increase a value of an angle 74 formed between adjacent lift arms 32. The angle 74 can be defined between centerlines of adjacent lift arms 32 (e.g., centerlines that extend substantially through a center of the lift arms 32). For example, the actuator 34*a* is configured to extend/retract to increase/decrease the angle 74*a* defined between a centerline of the lower lift arm 32*a* and the longitudinal axis 78 (angle 74*a* can also be defined between the centerline of the lower lift arm 32*a* and a plane defined by the longitudinal axis 78 and lateral axis 80) and facilitate lifting of the platform assembly 16 (e.g., moving platform assembly 16 at least partially along the upward direction 46). Likewise, the actuator 34*b* can be configured to retract to decrease the angle 74*a* to facilitate lowering of the platform assembly 16 (e.g., moving platform assembly 16 at least partially along the downward direction 48). Similarly, the actuator 34*b* is configured to extend to increase the angle 74*b* defined between centerlines of the lower lift arm 32*a* and the medial lift arm 32*b* and facilitate elevating of the platform assembly 16. Similarly, the actuator 34*b* is configured to retract to decrease the angle 74*b* to facilitate lowering of the platform assembly 16. The electric actuator 34*c* is similarly configured to extend/retract to increase/decrease the angle 74*c*, respectively, to raise/lower the platform assembly 16.

The actuators 34 can be mounted (e.g., rotatably coupled, pivotally coupled, etc.) to adjacent lift arms 32 at mounts 40 (e.g., mounting members, mounting portions, attachment members, attachment portions, etc.). The mounts 40 can be positioned at any position along a length of each lift arm 32. For example, the mounts 40 can be positioned at a midpoint of each lift arm 32, and a lower end of each lift arm 32.

The intermediate lift arm 32*d* and the frame 24 are configured to pivotally interface/couple at a platform rotator 30 (e.g., a rotary actuator, a rotational electric actuator, a gear box, etc.). The platform rotator 30 facilitates rotation of the platform assembly 16 about the axis 28 relative to the intermediate lift arm 32*d*. In some embodiments, the platform rotator 30 is between the frame 24 and the upper lift arm 32*c* and facilitates pivoting of the platform assembly 16 relative to the upper lift arm 32*c*. The axis 28 extends through a central pivot point of the platform rotator 30. The intermediate lift arm 32*d* is also configured to extend/retract along the upper lift arm 32*c*. The intermediate lift arm 32*d* can also be configured to pivotally/rotatably couple with the upper lift arm 32*c* such that the intermediate lift arm 32*d* pivots/rotates about the axis 25. The intermediate lift arm 32*d* can be driven to rotate/pivot about axis 25 by extension and retraction of the actuator 34*d*.

The platform assembly 16 is configured to be driven to pivot about the axis 28 (e.g., rotate about axis 28 in either a clockwise or a counter-clockwise direction) by an electric or hydraulic motor 26 (e.g., a rotary electric actuator, a stepper motor, a platform rotator, a platform electric motor, an electric platform rotator motor, etc.). The motor 26 can be configured to drive the frame 24 to pivot about the axis 28 relative to the upper lift arm 32*c* (or relative to the intermediate lift arm 32*d*). The motor 26 can be configured to drive a gear train to pivot the platform assembly 16 about the axis 28.

The lift assembly 14 is configured to pivotally or rotatably couple with the base assembly 12. The base assembly 12 include a rotatable base member, a rotatable platform member, a fully electric turntable, etc., shown as a turntable 70. The lift assembly 14 is configured to rotatably/pivotally couple with the base assembly 12. The turntable 70 is rotatably coupled with a base, frame, structural support member, carriage, etc., of base assembly 12, shown as base 36. The turntable 70 is configured to rotate or pivot relative to the base 36. The turntable 70 can pivot/rotate about the central axis 42 relative to base 36, about a slew bearing 71. The turntable 70 facilitates accessing various elevated and angularly offset locations at the platform assembly 16. The turntable 70 is configured to be driven to rotate or pivot relative to base 36 and about the slew bearing 71 by an electric motor, an electric turntable motor, an electric rotary actuator, etc., shown as the turntable motor 44. The turntable motor 44 can be configured to drive a geared outer surface 73 of the slew bearing 71 that is rotatably coupled with base 36 about the slew bearing 71 to rotate the turntable 70 relative to the base 36. The lower lift arm 32*a* is pivotally coupled with the turntable 70 (or with a turntable member 72 of the turntable 70) such that the lift assembly 14 and the platform assembly 16 rotate as the turntable 70 rotates about the central axis 42. In some embodiments, the turntable 70 is configured to rotate a complete 360 degrees about the central axis 42 relative to the base 36. In other embodiments, the turntable 70 is configured to rotate an angular amount less than 360 degrees about the central axis 42 relative to the base 36 (e.g., 270 degrees, 120 degrees, etc.).

The base assembly 12 includes one or more energy storage devices (e.g., capacitors, batteries, Lithium-Ion batteries, Nickel Cadmium batteries, fuel tanks, etc.), shown as batteries 64. The batteries 64 are configured to store energy in a form (e.g., in the form of chemical energy) that can be converted into electrical energy for the various electric motors and actuators of the boom 10. The batteries 64 can be stored within the base 36. The boom 10 includes a controller 38 that is configured to operate any of the motors, actuators, etc., of the boom 10. The controller 38 can be configured to receive sensory input information from various sensors of the boom 10, user inputs from the HMI 20 (or any other user input device such as a key-start or a push-button start), etc. The controller 38 can be configured to generate control signals for the various motors, actuators, etc., of the boom 10 to operate any of the motors, actuators, electrically powered movers, etc., of the boom 10. The batteries 64 are configured to power any of the motors, sensors, actuators, electric linear actuators, electrical devices, electrical movers, stepper motors, etc., of the boom 10. The base assembly 12 can include a power circuit including any necessary transformers, resistors, transistors, thermistors, capacitors, etc., to provide appropriate power (e.g., electrical energy with appropriate current and/or appropriate voltage) to any of the motors, electric actuators, sensors, electrical devices, etc., of the boom 10. Alternatively, in some examples, the base assembly 12 includes an internal combustion engine that is configured to charge and/or provide energy to the one or more energy storage devices (i.e., the batteries 64).

The batteries 64 are configured to deliver power to the motors 52 to drive the tractive elements 82. A rear set of tractive elements 82 can be configured to pivot to steer the boom 10. In other embodiments, a front set of tractive elements 82 are configured to pivot to steer the boom 10. In still other embodiments, both the front and the rear set of tractive elements 82 are configured to pivot (e.g., independently) to steer the boom 10. In some examples, the base assembly 12 includes a steering system 150. The steering system 150 is configured to drive tractive elements 82 to pivot for a turn of the boom 10. The steering system 150 can be configured to pivot the tractive elements 82 in pairs (e.g., to pivot a front pair of tractive elements 82), or can be configured to pivot tractive elements 82 independently (e.g., four-wheel steering for tight-turns).

In some examples, the base assembly 12 also includes an HMI 21 (e.g., a user interface, a user input device, a display screen, etc.). In some embodiments, the HMI 21 is coupled with the base 36. In other embodiments, the HMI 21 is positioned on the turntable 70. The HMI 21 can be positioned on any side or surface of the base assembly 12 (e.g., on the front 62 of the base 36, on the rear 60 of the base 36, etc.)

Figure 2:
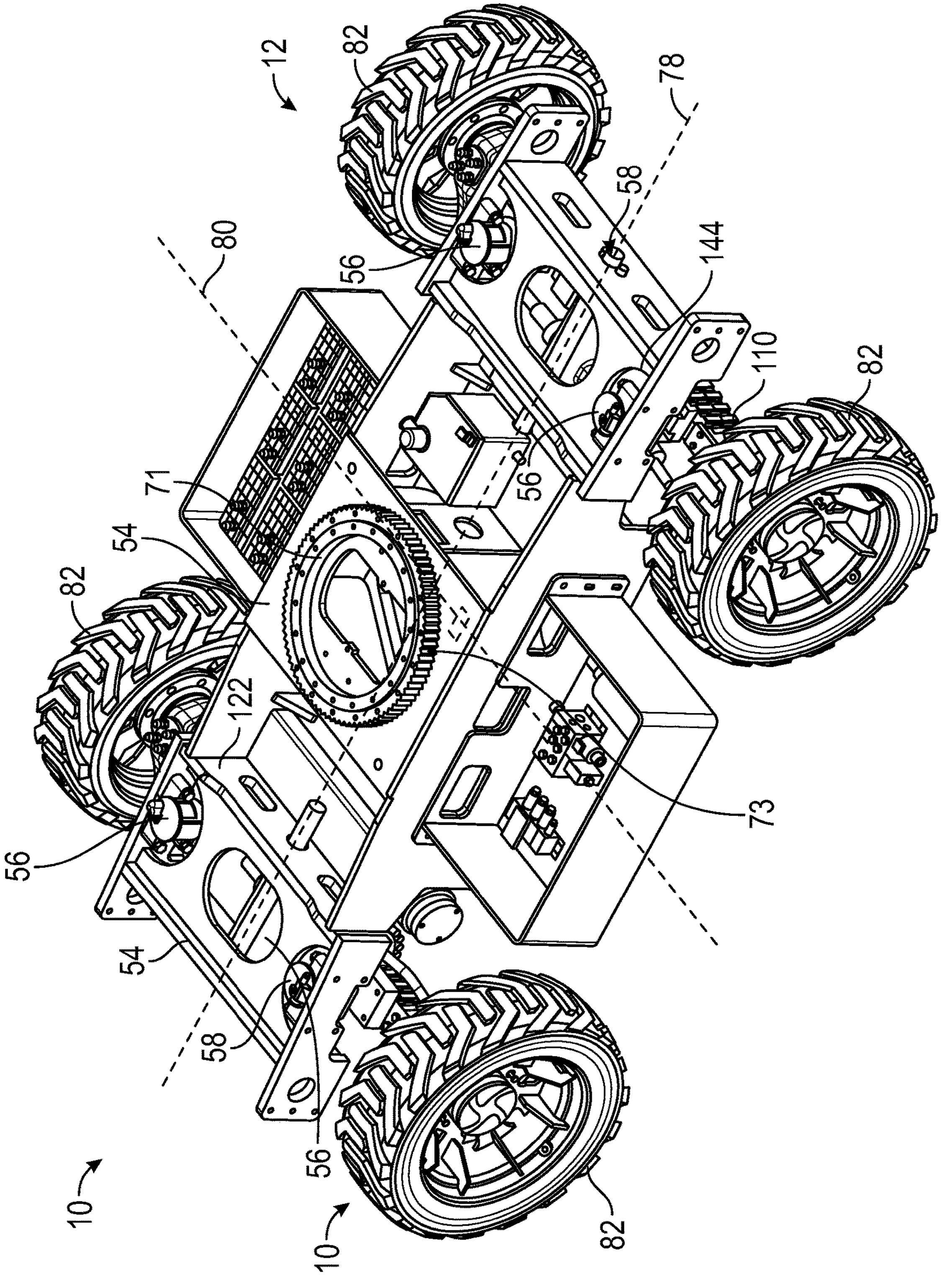
FIG. 2 is a top perspective view of a base assembly of the boom lift of FIG. 1, with a turntable removed.
Figure 3:
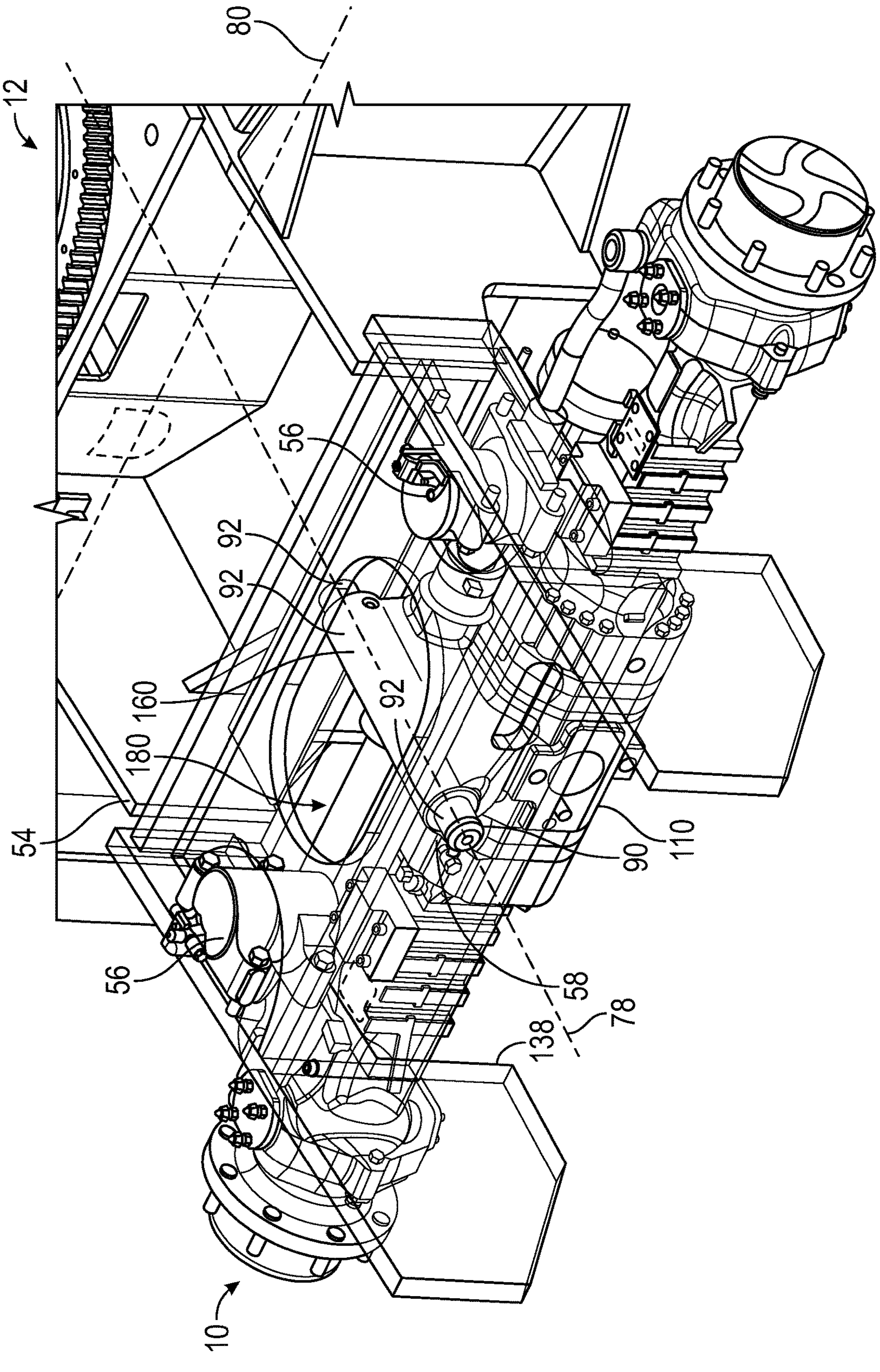
FIG. 3 is a top perspective view of a portion of the base assembly of FIG. 2.

Referring now to FIGS. 2 and 3, the base assembly 12 includes a longitudinally extending frame member 54 (e.g., a rigid member, a structural support member, an axle, a base, a frame, a carriage, etc.). The longitudinally extending frame member 54 provides structural support for the turntable 70 as well as the tractive elements 82. The longitudinally extending frame member 54 is pivotally coupled with lateral frame members 110 (e.g., axles, frame members, beams, bars, etc.) at opposite longitudinal ends of the longitudinally extending frame member 54. For example, the lateral frame members 110 may be pivotally coupled with the longitudinally extending frame member 54 at a front end and a rear end of the longitudinally extending frame member 54. The lateral frame members 110 can be configured to pivot about a pivot joint 58. The pivot joint 58 can include a pin and a receiving portion (e.g., a bore, an aperture, etc.). The pin of the pivot joint 58 is coupled to one of the lateral frame member 110 (e.g., a front lateral frame member 110 or a rear lateral frame member 110) or the longitudinally extending frame member 54 and the receiving portion is coupled to the other of the longitudinally extending frame member 54 and the lateral frame member 110. For example, the pin may be coupled with longitudinally extending frame member 54 and the receiving portion can be coupled with one of the lateral frame members 110 (e.g., integrally formed with the front lateral frame member 110).

In some embodiments, the longitudinally extending frame member 54 and the lateral frame members 110 are integrally formed or coupled (e.g., fastened, welded, riveted, etc.) to define the base 36. In still other embodiments, the base 36 is integrally formed with the longitudinally extending frame member 54 and/or the lateral frame members 110. In still other embodiments, the base 36 is coupled with the longitudinally extending frame member 54 and/or the lateral frame members 110.

The base assembly 12 includes one or more axle actuators 56 (e.g., electric linear actuators, electric axle actuators, electric levelling actuators, hydraulic cylinders, etc.). The axle actuators 56 can be linear actuators configured to receive power from the batteries 64, for example. The axle actuators 56 can be configured to extend or retract to contact a top surface of a corresponding one of the lateral frame members 110. When the axle actuators 56 extend, an end of a rod of the levelling actuators can contact the surface of lateral frame member 110 and prevent relative rotation between lateral frame member 110 and longitudinally extending frame member 54. In this way, the relative rotation/pivoting between the lateral frame member 110 and the longitudinally extending frame member 54 can be locked (e.g., to prevent rolling of the longitudinally extending frame member 54 relative to the lateral frame members 110 during operation of the lift assembly 14). The axle actuators 56 can receive power from the batteries 64, which can allow the axle actuators 56 to extend or retract. The axle actuators 56 receive control signals from controller 38.

Figure 4:
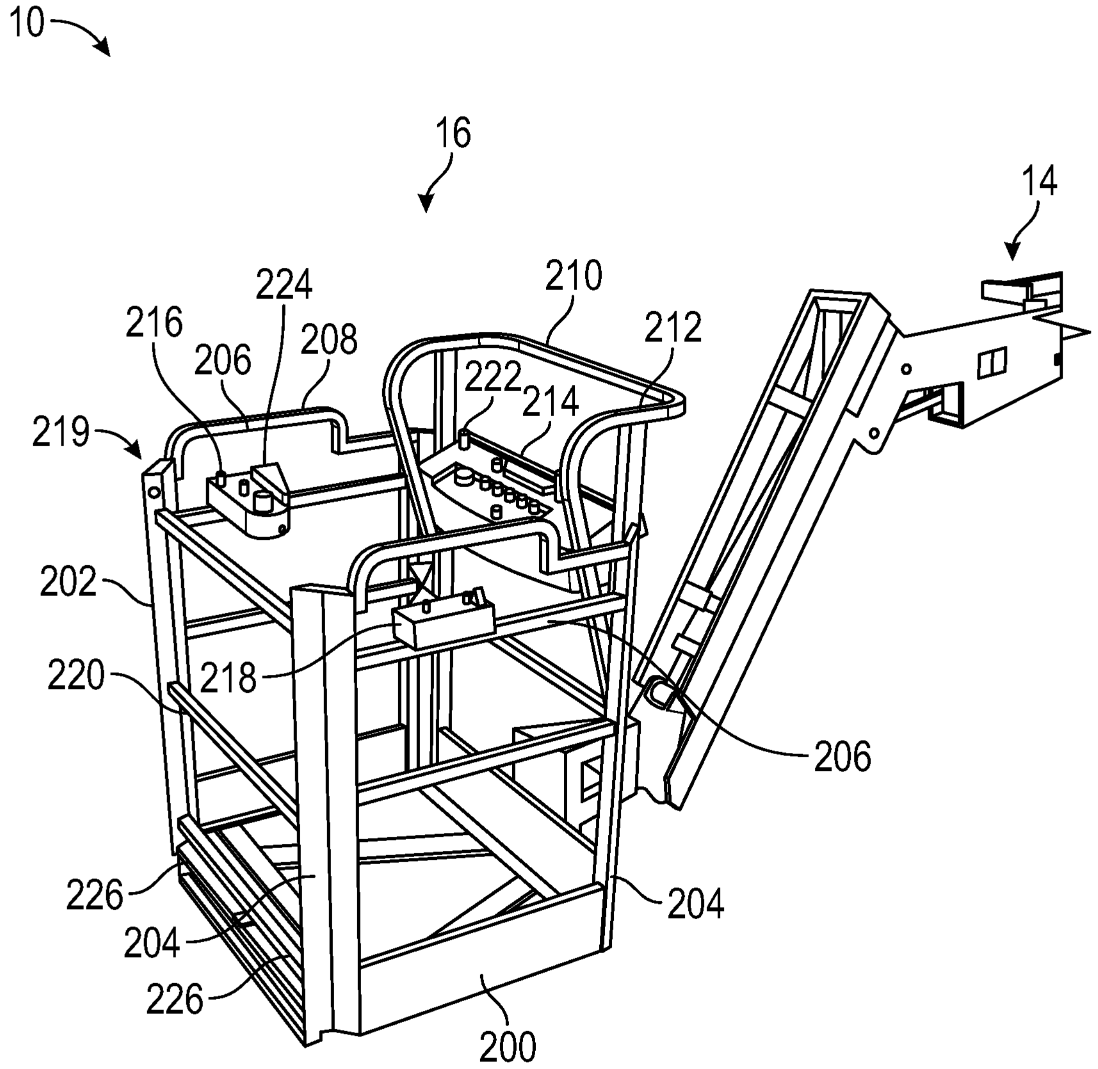
FIG. 4 is a top perspective view of a primary platform assembly of the boom lift of FIG. 1.

Referring now to FIG. 4, a platform assembly 16 for the boom 10 is depicted in additional detail. The platform assembly 16 is coupled to a distal end of the lift assembly 14 and generally includes a platform base 200 and a surrounding rail structure 202, rail assembly, guardrail. The base 200 can be rectangular, for example, and can be configured to support one or more operators. The rail structure 202 includes a series of rectangular rail panels 204 that extend upwardly away from the base 200. The base 200 defines a top surface or work surface, shown a support surface 205, that is configured to support one or more operators and/or objects. The rail structure 202 surrounds the support surface 205 to contain operators and/or objects supported by the support surface 205. The platform assembly 16 can be considered a primary platform assembly.

In some examples, each of the rail panels 204 within the rail structure 202 is differently shaped. For example, each of the side panels 206 can include a raised handlebar 208 configured to provide support for the hands of an operator standing on the platform base 200. The rear panel 210 can include a raised segment 212 that extends above the other components within the rail structure 202. In some examples, each of the raised segment 212 and raised handlebars 208 can be positioned above control panels 214, 216, 218 on the platform assembly 16. As depicted in FIG. 4, a main control panel 214 can be positioned upon the rear panel 210, while auxiliary control panels 216, 218 can be positioned along either of the side panels 206. Each of the control panels 214, 216, 218 can be in communication with the lift system 14 and used to position the platform assembly 16 relative to other objects. The rail structure 202 defines an opening 219, through which the operator can enter or exit the platform assembly 16. The rail structure 202 further includes a front panel 220 or door that is configured to selectively open (e.g., rotate about a hinge, etc.). In a closed position (shown in FIG. 4), the front panel 220 extends across the opening, preventing movement of the operator through the opening 219. In an open position (shown in FIG. 5), the front panel 220 is moved away from the opening 219, permitting free movement through the opening 219. As explained in additional detail below, the front panel 220 can include a locking mechanism that prevents rotation of the front panel 220 in certain situations.

Figure 5:
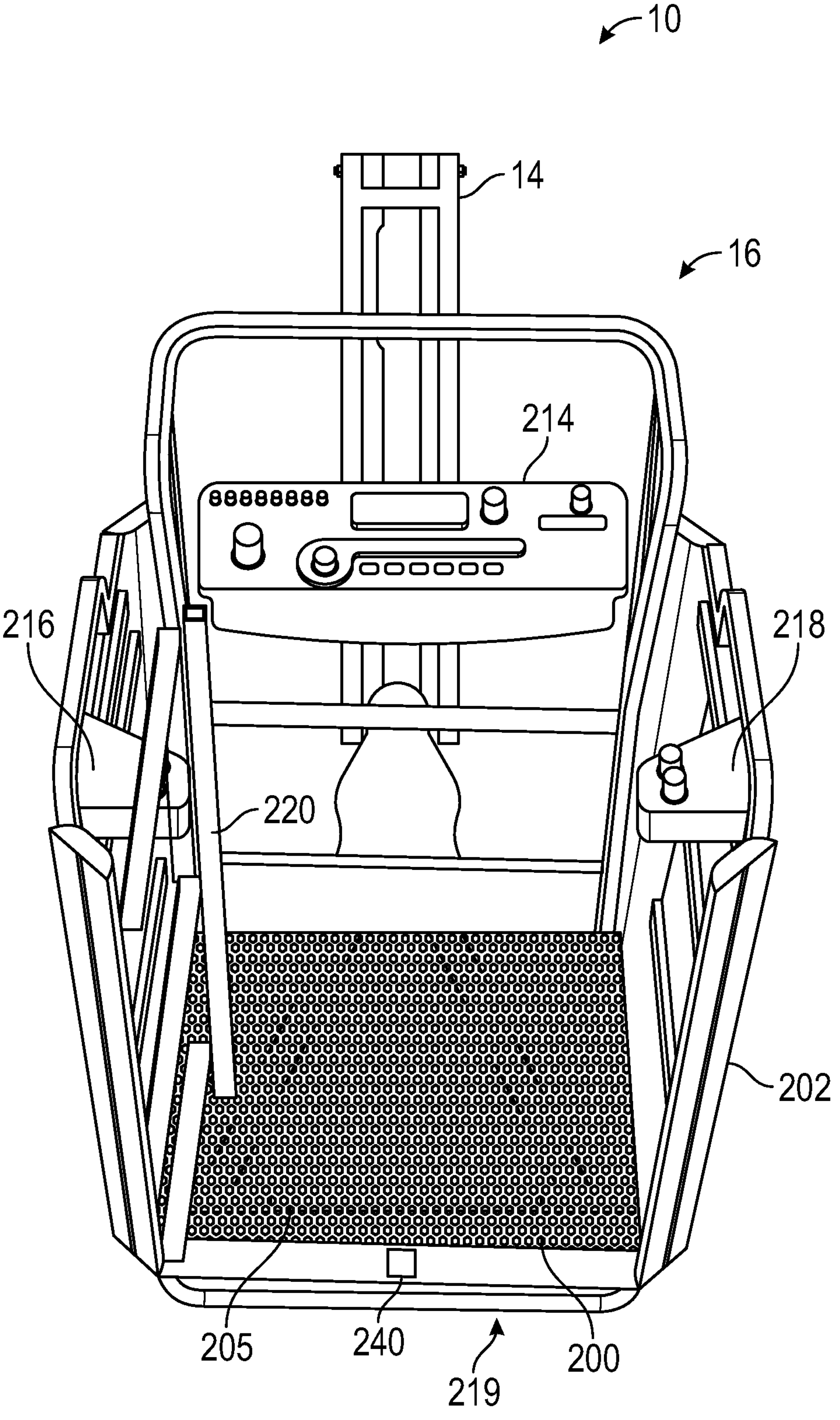
FIG. 5 is a front perspective view of the primary platform assembly of FIG. 4.
Figure 6:
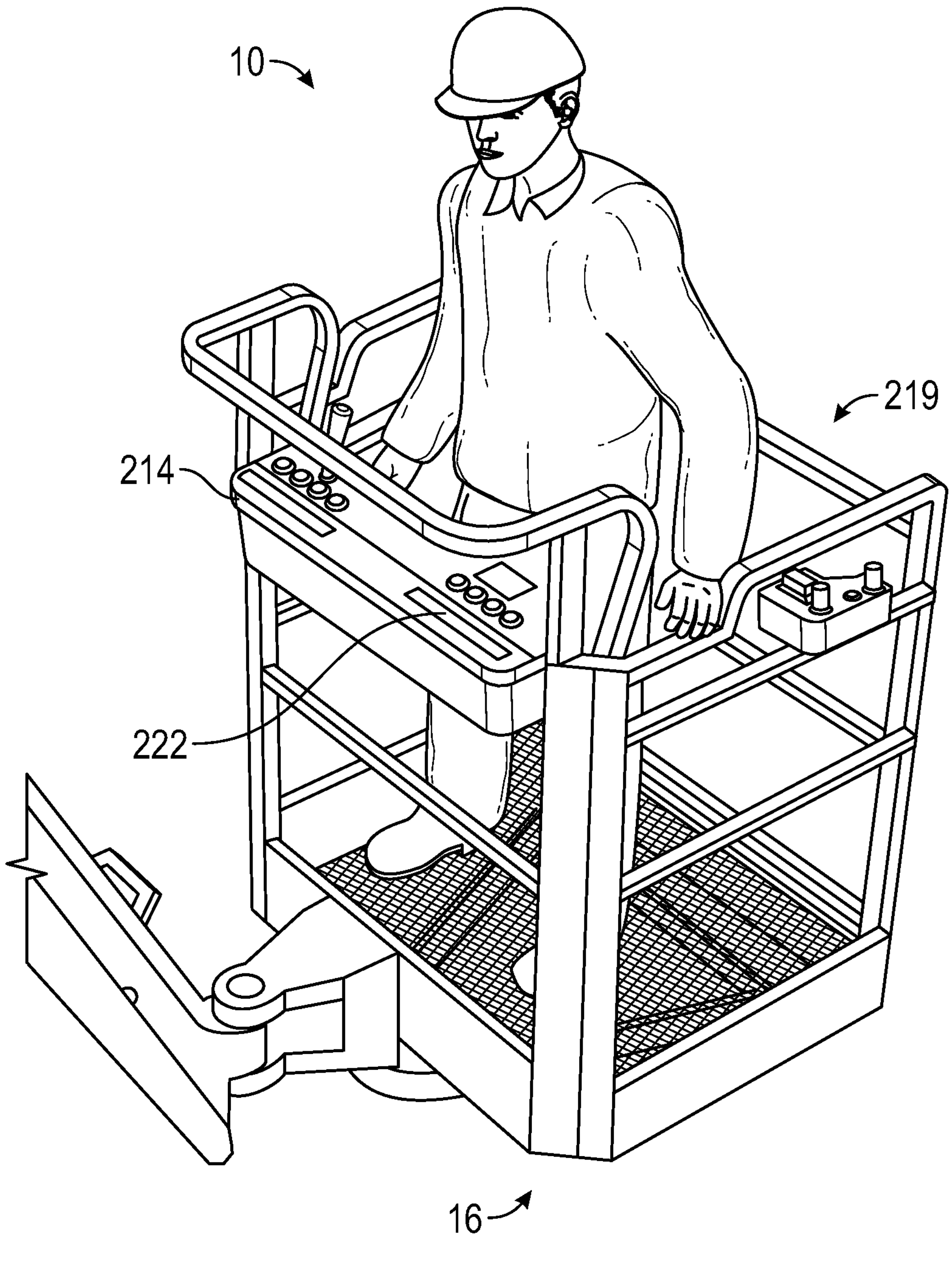
FIG. 6 is a side perspective view of the primary platform assembly of FIG. 4, depicting an operator using a first control panel.
Figure 7:
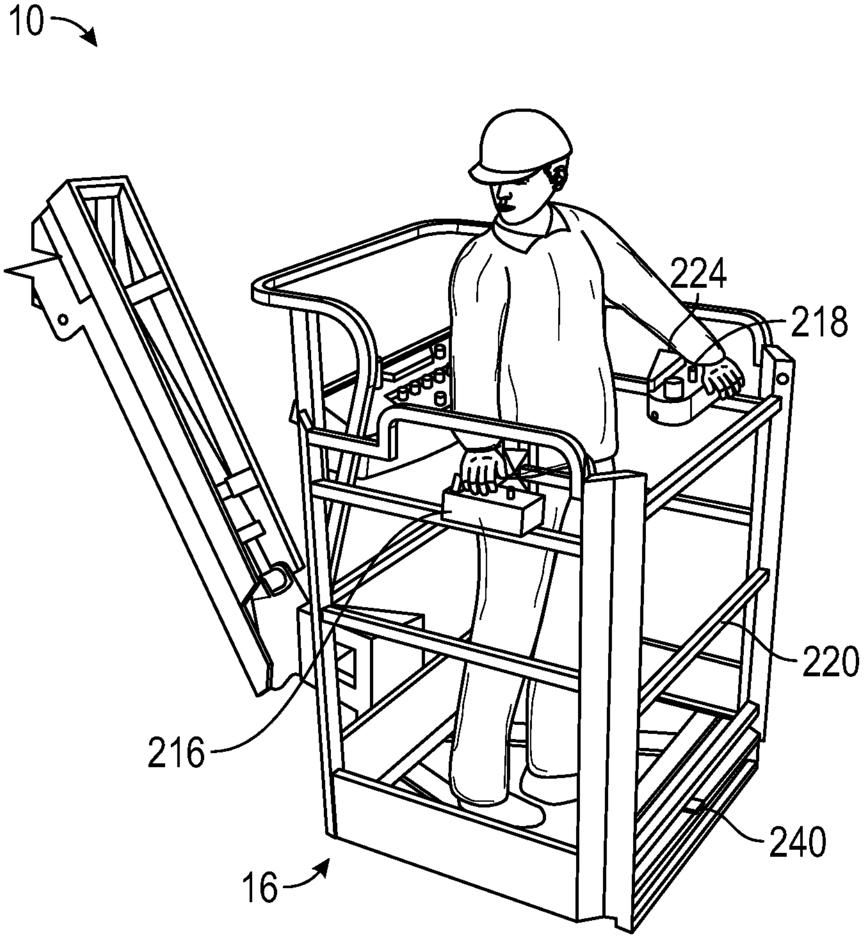
FIG. 7 is a side perspective view of the primary platform assembly of FIG. 4, depicting an operator using a second control panel.

With additional reference to FIGS. 5-7, the control panels 214, 216, 218 of the primary platform assembly are shown in additional detail. As depicted in FIG. 5, the main control panel 214 is positioned along the rear panel 210. The main control panel 214 extends across approximately the entire rear panel 210, and provides an array of inputs 222 that can be interacted with to operate the boom 10. In some examples, the inputs 222 include one or more joysticks that allow an operator on the platform base 200 to both drive the boom 10 and adjust a position of the platform assembly 16 using the lift assembly 14. In some examples, the main control panel 214 faces rearward, toward the base assembly 12 and lift assembly 14. As depicted in FIG. 6, an operator can interact with the main control panel 214 while facing rearward, toward the lift assembly 14 and base assembly 12. Should the operator wish to face outward, as depicted in FIG. 7, the auxiliary control panels 216, 218 can be used to positon the platform assembly 16 and drive the boom 10. In some examples, each of the auxiliary control panels 216, 218 includes a joystick that is configured to operate one of the lift assembly 14 and the base assembly 12. Accordingly, the auxiliary control panels 216, 218 and the main control panel 214 can each be used to drive and operate the boom 10. In some examples, the inputs 222 on the main control panel 214 can be disabled when the inputs on one of the auxiliary control panels 216, 218 are in use. Alternatively, the inputs on the auxiliary control panels 216, 218 can be disabled when one or more of the inputs 222 on the main control panel are in use. In still other examples, the auxiliary control panels 216, 218 can be configured to control the lift assembly 14 and platform assembly 16 position, while the inputs 222 on the main control panel 214 can be used to drive and adjust the position of the base assembly 12. Accordingly, the control panels 214, 216, 218 provide both job facing controls and boom facing controls, which can allow an operator increased visibility when performing tasks.

Figure 8:
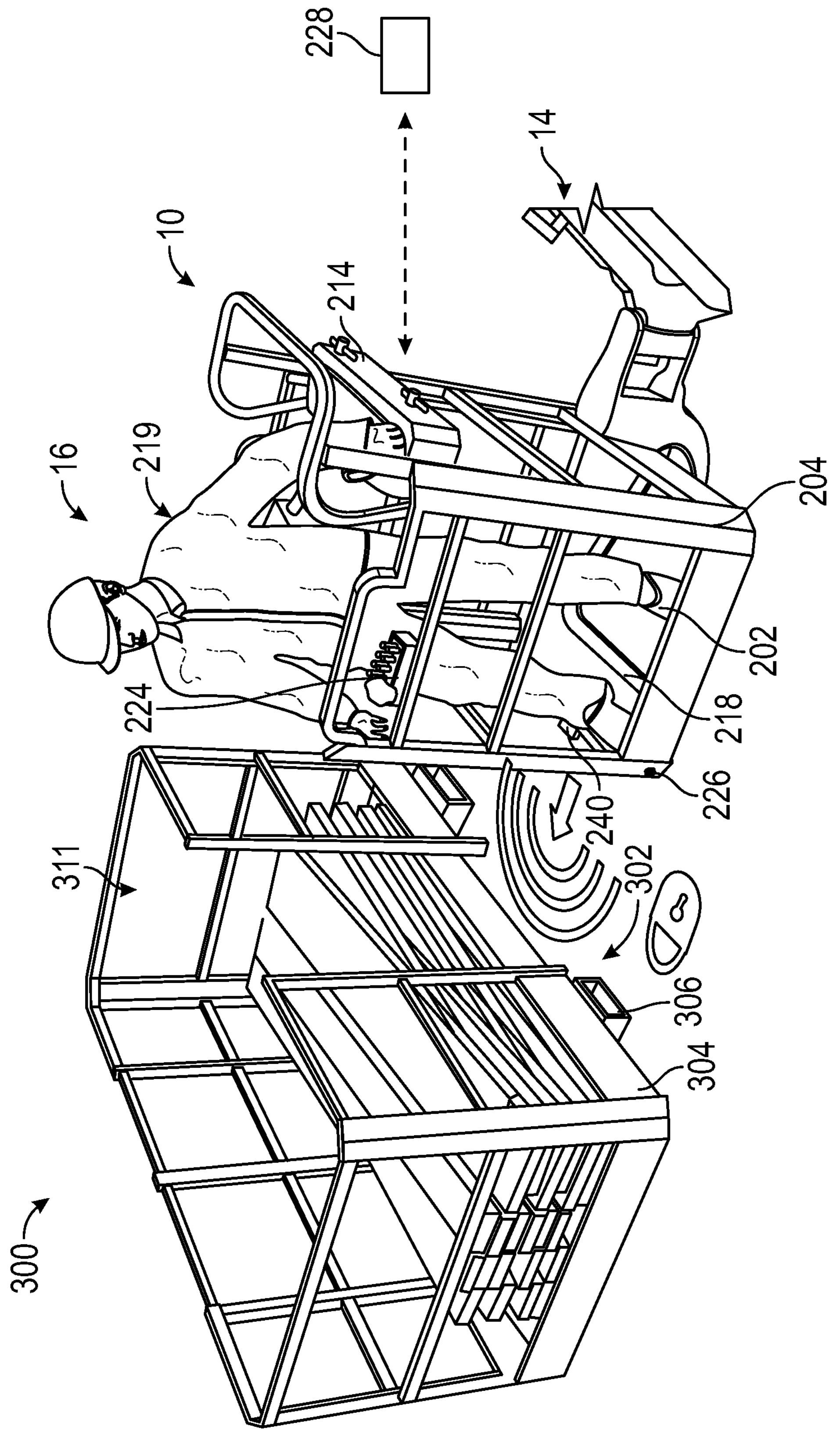
FIG. 8 is a perspective view of the primary platform assembly of FIG. 4, depicting a coupling process with a secondary platform assembly.
Figure 9:
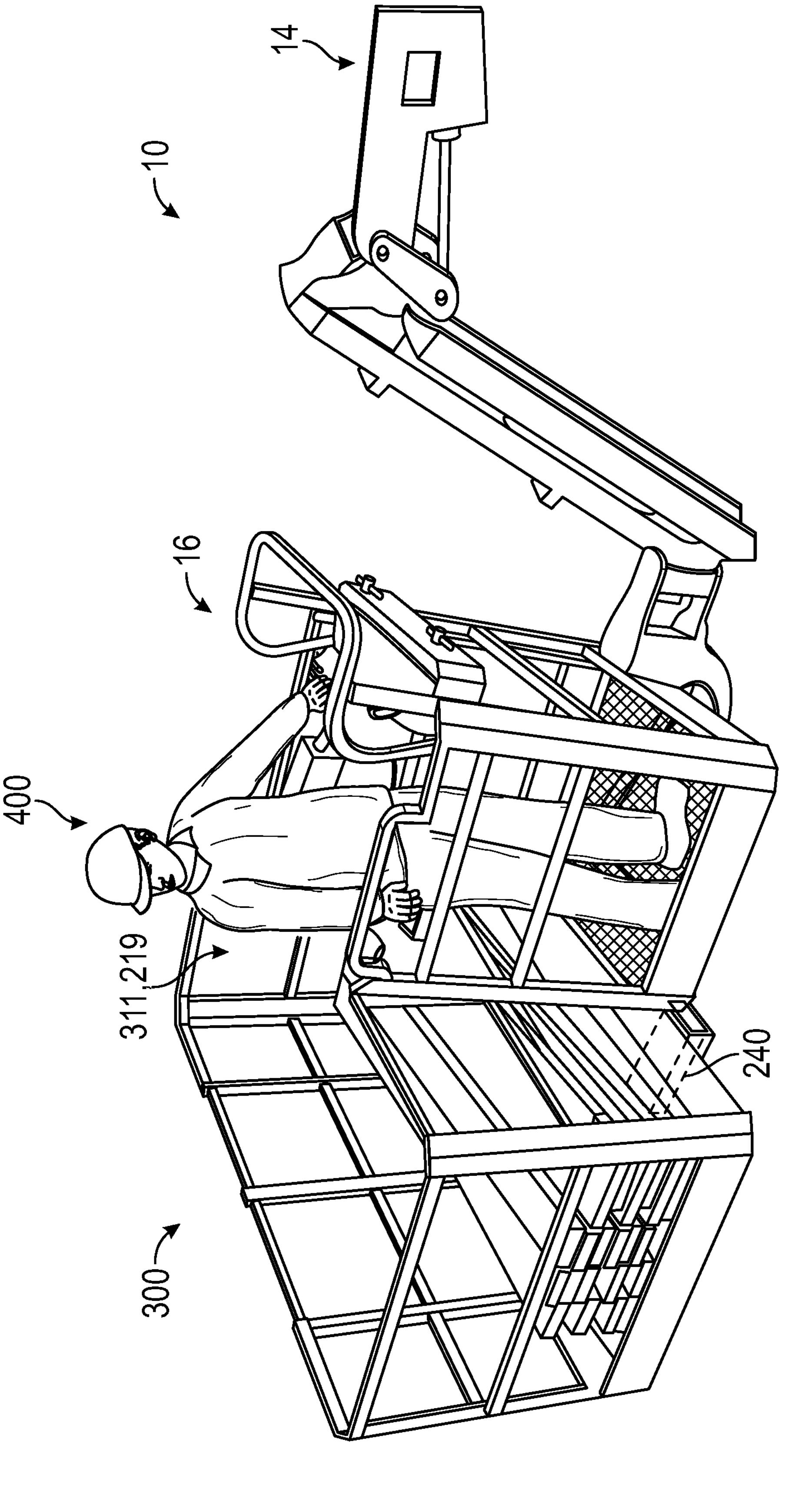
FIG. 9 is a perspective view of a platform the primary platform assembly of FIG. 4 and the secondary platform assembly of FIG. 8 coupled together.

Referring now to FIGS. 8 and 9, the primary platform assembly 16 is configured to be selectively coupled with one or more secondary platform assemblies 300 to create a combined platform assembly 400 for use with the boom 10. The primary platform assembly 16 generally includes a locking mechanism 240 that includes one or more actuators that are configured to be deployed to create a secure, yet removable and releasable coupling with the secondary platform assembly 300 so that a larger overall platform is created. As explained in additional detail below, the secondary platform assembly 300 can define an additional work surface to create a much larger working area for an operator of the boom 10, a storage vessel for holding tools or materials, a robotic attachment, or other useful equipment that can be used by an operator at height to complete a task. The locking mechanism 240 allows the secondary platform to be hot-swappable with other secondary platform assemblies 300.

The coupling process between the primary platform assembly 16 and a secondary platform assembly 300 can be an autonomous or semi-autonomous process carried out by the control panels 214, 216, 218. For example, in some embodiments, an operator can interact with the joysticks on one or more of the auxiliary control panels 216, 218 or the main control panels 214 to position the primary platform assembly 16 relative to the secondary platform assembly 300. In some examples, the primary platform assembly 16 is defined by a width that is approximately half a width of the secondary platform assembly 16. The operator can position the primary platform assembly 16 to be approximately centered relative to secondary platform assembly 300, which corresponds to a location in which the locking mechanism 240 can engage and secure the secondary platform assembly 300. The locking mechanism 240 can be actuated by an input 224 on one of the control panels 214, 216, 218.

In some examples, the coupling process between the primary platform assembly 16 and the secondary platform assembly 300 is more automated. An operator can first position the platform assembly 16 nearby a secondary platform assembly 300. Once the primary platform assembly 16 is positioned within close proximity to a secondary platform assembly 300 (e.g., 2 feet, 6 feet, 10 feet, etc.), the operator can initiate a coupling sequence. In some examples, the coupling sequence between the primary platform assembly 16 and the secondary platform assembly 300 can begin when the operator actuates one or more inputs 224 on one of the auxiliary control panels 216, 218 or one of the inputs 222 on the main control panel 214.

Once the input 222, 224 has been actuated or otherwise interacted with, the coupling process begins. One or more sensors 226 positioned on the primary platform assembly 16 can begin scanning to the location of the secondary platform assembly 300. The sensors 226 can be in communication with one or more of the control panels 214, 216, 218, and can provide data that can allow one or more controllers 228 associated with the control panels 214, 216, 218 to adjust a position of the primary platform assembly 16 relative to the secondary platform assembly 300 using the lift assembly 14. The sensors 226 continuously scan for the location of the coupling area 302 of the secondary platform assembly 300, and feedback from the sensors 226 is provided to the controllers 228 to adjust the positioning of the primary platform assembly 16 until it is positioned properly, centered relative to the secondary platform assembly 300. In some examples, the sensors 226 are optical sensors (e.g., cameras) that obtain video or image feedback to the controllers 228. In other examples, the sensors 226 use radio frequencies (e.g., RFID, Wi-Fi, near-field communication) or electromagnetic signals to detect a location of the secondary platform assembly 300 relative to the primary platform assembly 16. In still other examples, position sensors can be used. The coupling area 302 of the secondary platform assembly 300 can be provided with visual cues (e.g., retroreflective markers, etc.) or other positioning features (e.g., radio frequency tags, etc.) that are configured for use with the sensors 226 and the controllers 228 to help achieve a precise positioning process every time using a closed loop feedback system.

The controllers 228, sensors 226, and lift assembly 14 continue to adjust a position of the primary platform assembly 16 relative to the secondary platform assembly 300 until the appropriate relative positioning is achieved for creating a coupling. Once this positioning is accomplished, the locking mechanism 240 (e.g., a lock) can be engaged. In some embodiments, the locking mechanism 240 is coupled to the primary platform assembly 16 and selectively and removably engages with the secondary platform assembly 300. In some embodiments, the locking assembly 240 is manually actuated by a user (e.g., by moving a lever, etc.). In other embodiments, the locking assembly 240 is controlled by the controllers 228 (e.g., through electrical, pneumatic, or hydraulic actuation, etc.). In some examples, the locking mechanism 240 includes arms that are configured to engage a platform base 304 of the secondary platform assembly 300. In some examples, the arms can be positioned on either side of the platform base 304 so that a clamp-style coupling is created between the primary platform assembly 16 and the secondary platform assembly 300. In other examples, the arms extend outwardly and are configured to rotate into engagement with fork pockets 306 that are formed beneath the platform base 304. The arms rotate outwardly, into engagement with inner walls 308 of the fork pockets 306. The engagement between the arms of the locking mechanism 240 and the fork pockets 306 can create a rigid, yet releasable coupling that can be readily engaged and disengaged to facilitate the use of several secondary platform assemblies 300 at a jobsite. In still other examples, the arms of the locking mechanism extend forward, approximately parallel to the fork pockets 306 but positioned laterally inside of the fork pockets 306, within the coupling area 302. The arms can include hooks that extend upwardly, which can be used to secure with a forward end of the platform base 304.

Once the locking mechanism 240 has engaged the secondary platform assembly 300 and the coupling is created, the combined platform assembly 400 is created. The combined platform assembly 400 can then be lifted and otherwise positioned using the lift assembly 14, allowing both the primary platform assembly 16 and the secondary platform assembly 300 to be moved to accomplish tasks at height. Likewise, an operator can then use the inputs on the control panels 214, 216, 218 to move the combined platform assembly 400 and boom 10 to desired locations.

Figure 10:
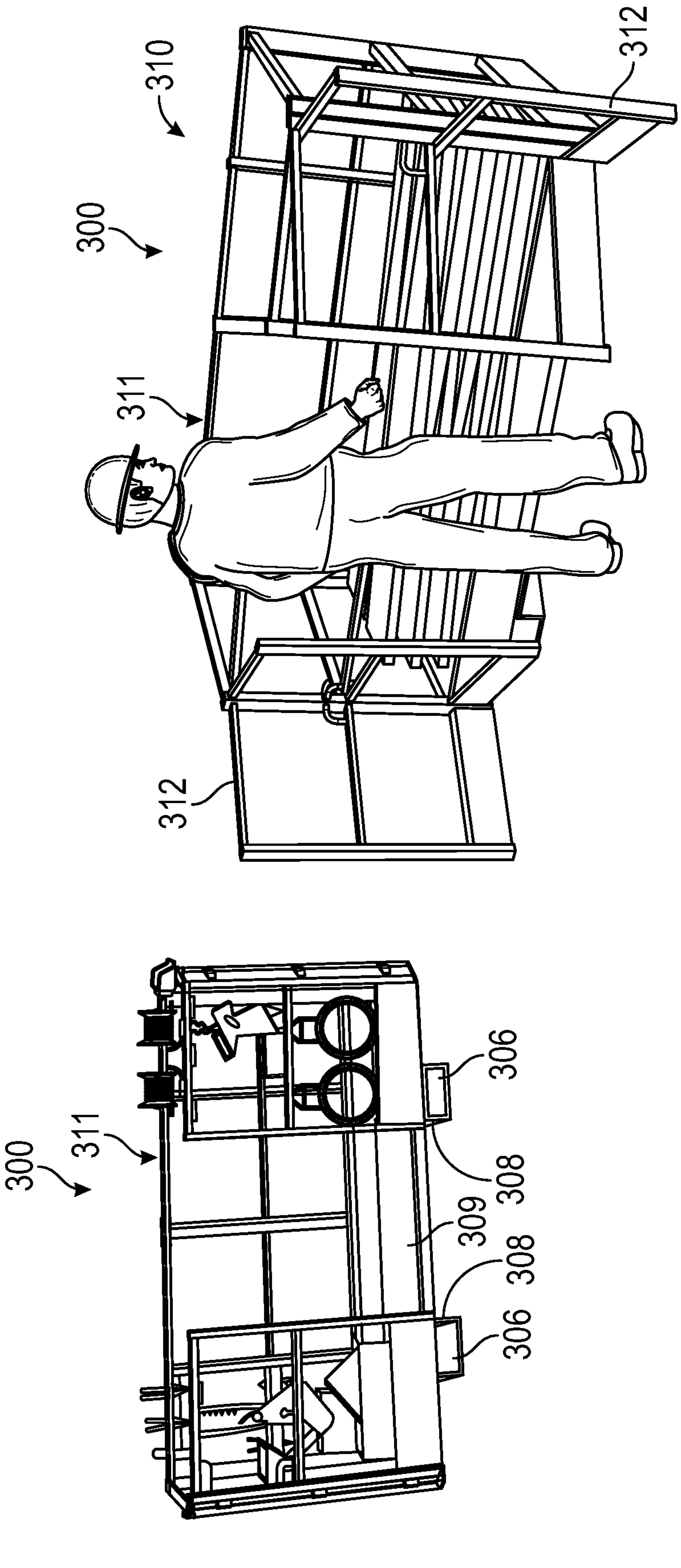
FIG. 10 is a perspective view of different secondary platform assemblies that can be coupled to the primary platform of FIG. 4.

The quick coupling process that can be performed by the locking mechanism 240 of the primary platform assembly 16 allows the boom 10 to be used in a highly-customizable and efficient manner that conventional booms are not able to achieve. For example, and as shown in FIGS. 9 and 10, a variety of different secondary platform assemblies 300 can be positioned about a jobsite to allow the boom 10 to be readily re-configured to perform different tasks. As depicted in FIG. 9, for example, the secondary platform assembly 300 can be configured as a storage vessel that can be used to haul raw materials, like lumber, to an elevated or otherwise difficult-to-reach area. In other examples, and as depicted in FIG. 10, the secondary platform assembly 300 can be configured with a series of specialized tools that are preselected for a task. Accordingly, the secondary platform assembly 300 can be treated as an extension of the primary platform assembly 16, and an operator can travel between the primary platform assembly 16 and the secondary platform assembly 300 to provide a much larger workspace.

Figure 11:
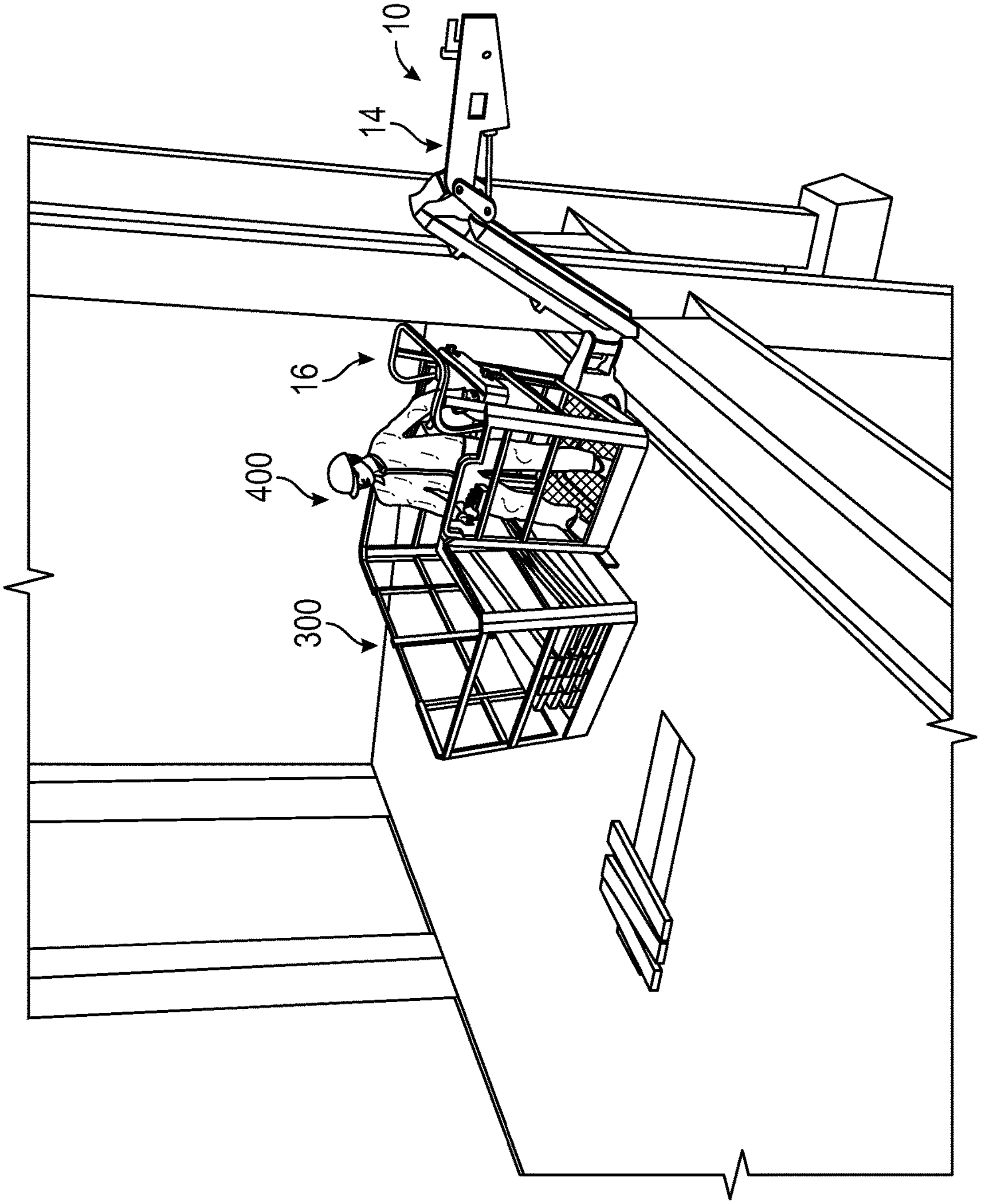
FIG. 11 is a perspective view of the platform assembly of FIG. 9, depicted at a jobsite.

FIGS. 11-15 depict operation of the boom 10 at a jobsite that is significantly streamlined by the use of multiple secondary platform assemblies 300 that can be readily coupled and decoupled from the primary platform assembly 16 of the boom 10. As depicted in FIG. 11, an operator can direct the combined platform assembly 400 toward a target area using the control panels 214, 216, 218 and the lift system 14. For example, at a construction site, the secondary platform assembly 300 can first be a material handling crate configured to carry raw materials (e.g., lumber, concrete, etc.). To further facilitate efficient work at a jobsite, the material handling crate can be pre-packaged based upon tasks to be completed later that day.

Figure 12:
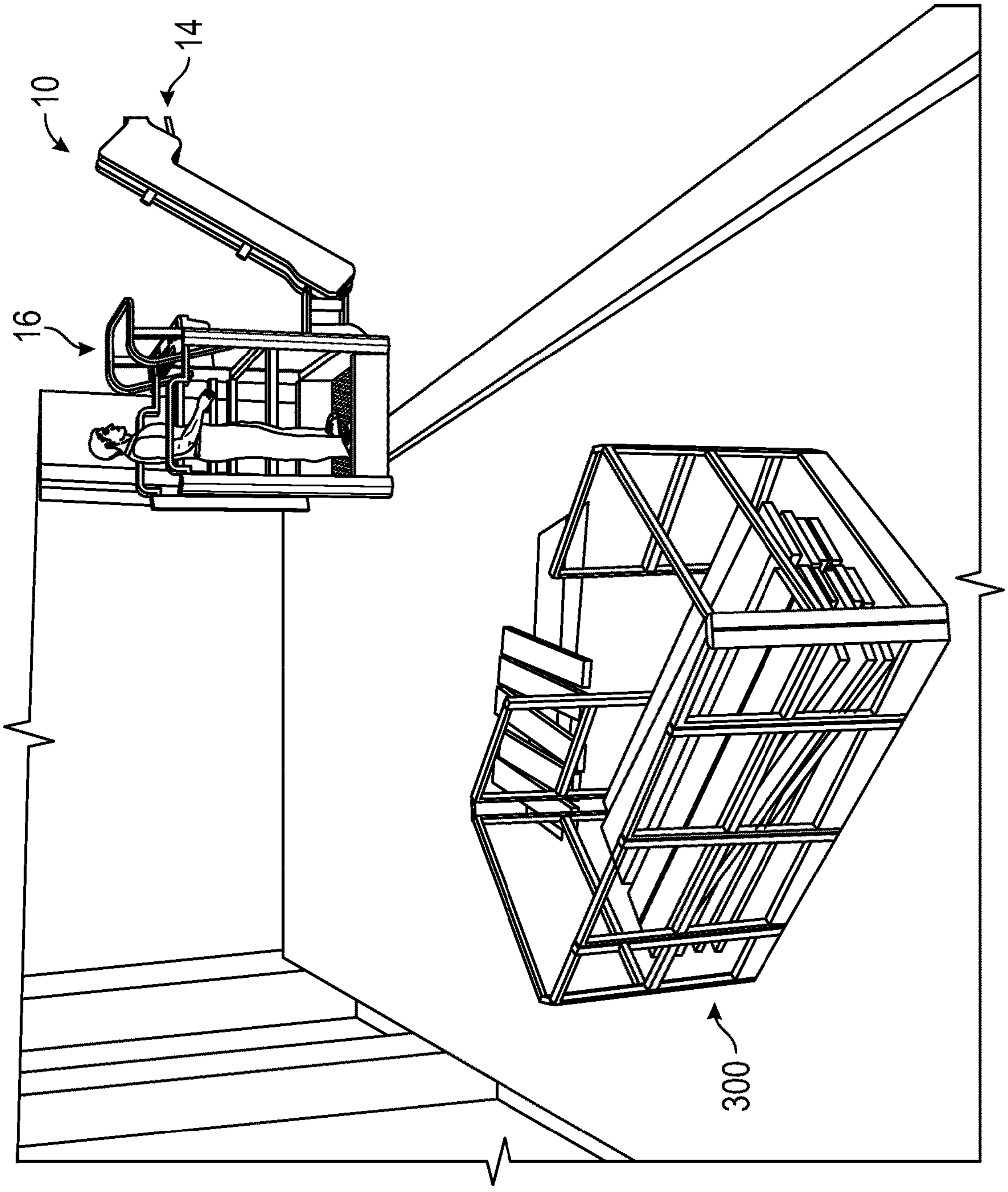
FIG. 12 is a perspective view of the platform assembly of FIG. 11, depicted with the secondary platform assembly decoupled from the primary platform assembly.

Once the secondary platform assembly 300 is positioned in a desired location at the elevated area (e.g., on top of a concrete slab), the operator can decouple the secondary platform assembly 300 from the primary platform assembly 16, as depicted in FIG. 12. Similar to the coupling process discussed above with respect to FIGS. 8-9, the operator can actuate one or more inputs on one of the control panels 214, 216, 218 to initiate the decoupling process of the locking mechanism 240. The decoupling process can involve retracting or otherwise disengaging the arms of the locking mechanism 240 so that the secondary platform assembly 240 is released, and does not require the operator to leave the platform 200 of the primary platform assembly 16 to perform. Once the primary platform assembly 16 is disengaged from the secondary platform assembly 300, the operator can use the control panels 214, 216, 218 to move the lift assembly 14 and primary platform assembly 16 away from the secondary platform assembly 300, to couple with another secondary platform assembly 300.

Figure 13:
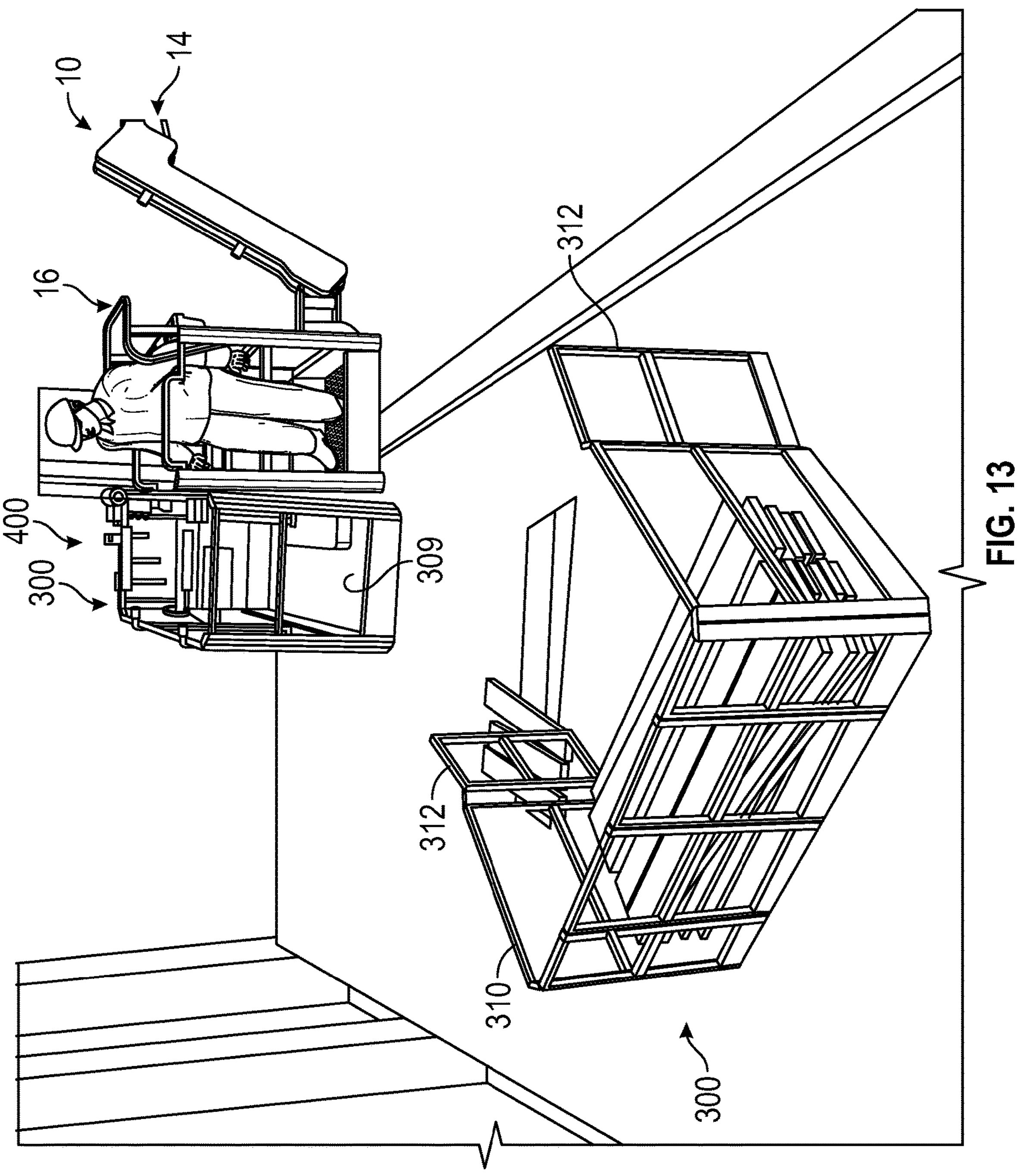
FIG. 13 is a perspective view of the secondary platform assembly of FIG. 12 with a rail assembly rotated to an accessible position.

As depicted in FIGS. 10 and 13, the platform base 304 defines a top surface or work surface, shown as support surface 309, that is configured to support one or more operators and/or objects. The material handling crate version of the secondary platform assembly 300 can include a rail assembly 310 (e.g., a guardrail) that is configured to facilitate moving materials onto and off of the platform base 304. The rail assembly 310 can at least partially surround the support surface 309 to contain the operators and/or objects. The rail assembly 310 defines an opening 311, through which an operator and can enter or exit the secondary platform assembly 300. As depicted in FIG. 10, the rail assembly 310 includes two doors 312 that are each configured to rotate outwardly, about hinges 314 formed within the outer perimeter of the rail assembly 310. By rotating outwardly, the opening 311 is expanded to the full width of the platform base 304. The opening 311 can then be used by an operator to easily transport large items (e.g., lumber) that is approximately the size of the entire platform base 304 into and out of the secondary platform assembly 300. Once the secondary platform assembly 300 has been loaded, the doors 312 can be rotated inwardly, such that a much smaller opening is present between the doors 312. The positioning of the doors 312 can help to maintain larger items within the secondary platform assembly 300.

When the primary platform assembly 16 and the secondary platform assembly 300 are aligned with one another, the opening 219 aligns with the opening 311, and the support surface 205 aligns with (e.g., becomes substantially coplanar with) the support surface 309. Accordingly, when the front panel 220 is opened, the support surface 205 and the support surface 309 form one continuous work surface that combines the area of the support surface 205 and the support surface 309. Accordingly, the combined platform assembly 400 provides a large area to support operators and/or objects. In some embodiments, the area of the support surface 309 is larger than the area of the support surface 205.

Figure 14:
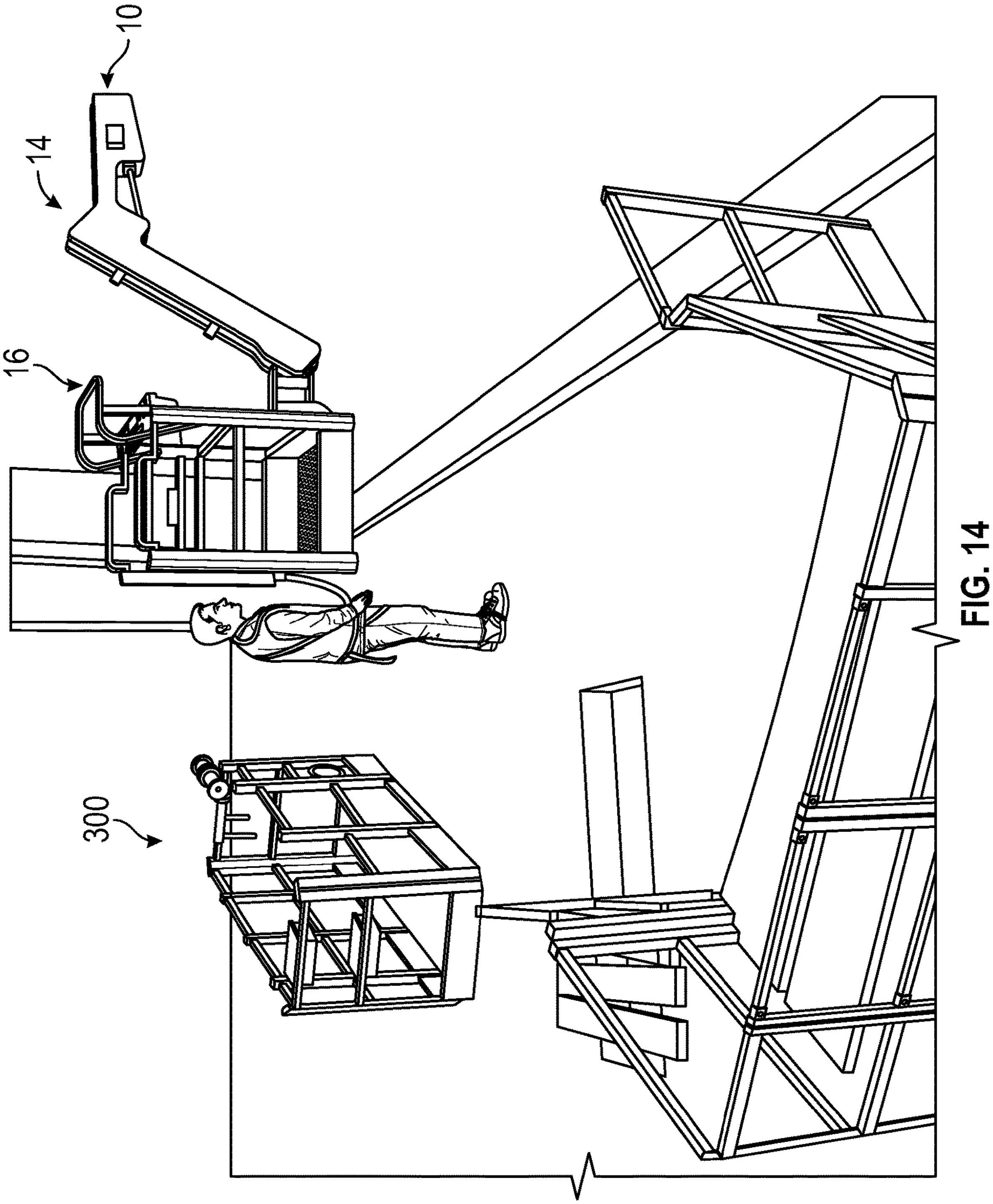
FIG. 14 is a perspective view of an operator at a jobsite next to the boom lift of FIG. 12.

With the material handling crate version of the secondary platform assembly 300 positioned upon the working surface and released (e.g., decoupled) from the primary platform assembly 16, the primary platform assembly 16 can couple with another secondary work platform assembly 300 to bring additional tools and/or a larger workspace to the working area. For example, and as depicted in FIG. 13, an auxiliary platform or tool crate version of the secondary platform assembly 300 can then be coupled to the primary platform assembly 16. The tool crate, like the material handling crate, can be used to support a variety of different items that can be used by a worker at a jobsite. The tool crate can be equipped with a variety of different features, as explained in more detail below, that can permit an operator to efficiently perform a task. In some examples, the tool crates can be customized for different types of jobs, such that only the necessary tools for a job are positioned within the tool crate for a given task. In other examples, the tool crate can be equipped with a variety of generic and often-used tools, such that an operator within the primary platform assembly can readily access tools while working upon either platform base 200, 304. Like the material handling crate version of the secondary platform assembly 300, the tool crate is readily and removably coupled to the primary platform assembly 16, as depicted in FIG. 14. The tool crate can be used to haul tools for several workers positioned at an elevated jobsite, and can then be left at the jobsite so that the primary platform assembly 16 can be used to retrieve another helpful secondary platform assembly 300.

Figure 15:
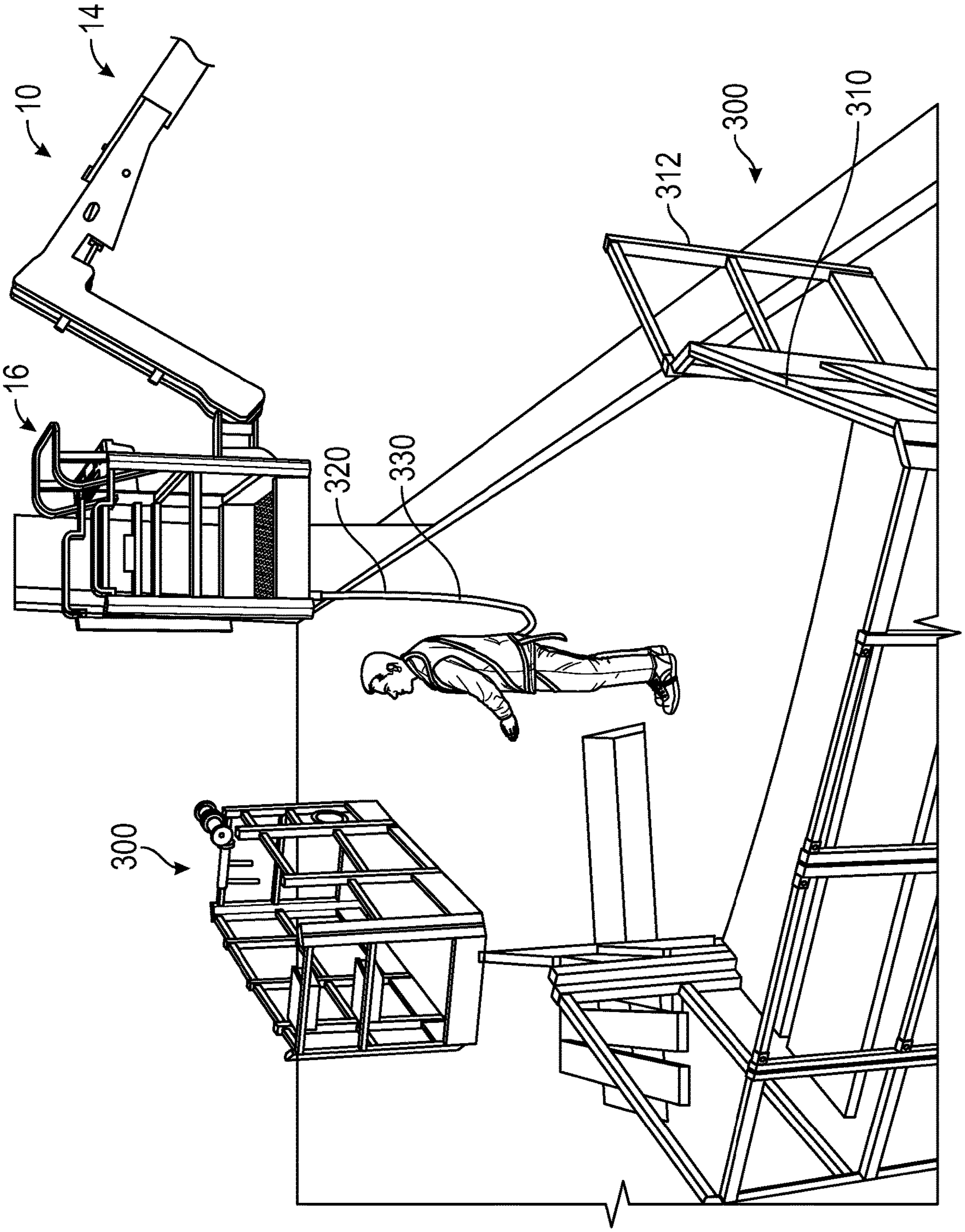
FIG. 15 is a perspective view of an operator at the jobsite of FIG. 14, shown with multiple secondary platform assemblies decoupled from the primary platform assembly for use at the jobsite.

Referring now to FIGS. 14 and 15, the boom 10 is further designed so that an operator can exit from the primary platform assembly 16. The operator can open the front panel 220 of the rail structure 202 and exit the platform base 200, onto the elevated work surface below. To promote easier operation and help an operator transition between the work surface and the platform base 200, a tether 320 or lanyard can be used. The tether 320 is configured to couple with the rail structure 202 (e.g., at a mobile fall arrest anchor point) and to the operator (e.g., using a belt loop or harness, etc.) The tether 320 can be sized so that the operator can move a specified distance away from the primary platform assembly 16 (e.g., within a radius of 15 feet or 30 feet, for example). Accordingly, the operator can then interact with both the materials within the material handling crate and the tools within the tool crate to perform tasks in the elevated work surface. The ability to haul large, readily pre-packaged secondary platform assemblies 300 to elevated jobsites provides versatility that is not provided by conventional boom systems.

In some examples, the tether 320 can be coupled with a smart lanyard 330 worn by the operator. The smart lanyard 330 can communicate a position of the operator to the controllers 228 and or the control panels 214, 216, 218, which can then position the primary platform assembly 16 using the lift assembly 14 in response to movement. In some examples, the boom 10 performs a follow function based upon the location of the smart lanyard 330. The smart lanyard 330 can be equipped with an accelerometer that is configured to detect fall conditions. The smart lanyard 330 can also function as login device for one or more of the control panels 214, 216, 218, that enables access and operation of the boom 10. The smart lanyard 330 can provide a wired or wireless connection with the one or more control panels 214, 216, 218 to transmit energy and data.

Figure 16:
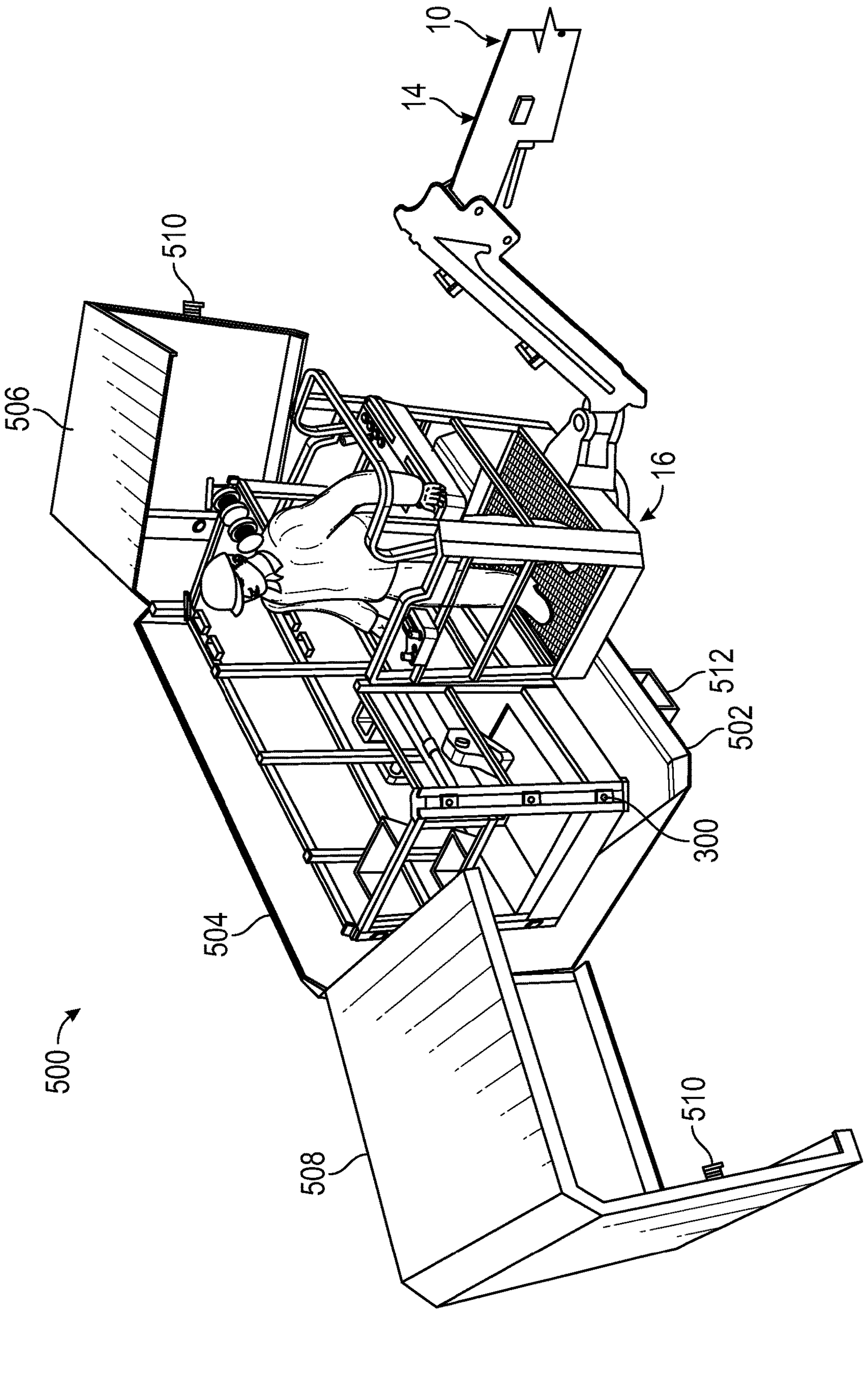
FIG. 16 is a perspective view of a locker assembly for use with one of the secondary platform assemblies of FIG. 10.
Figure 17:
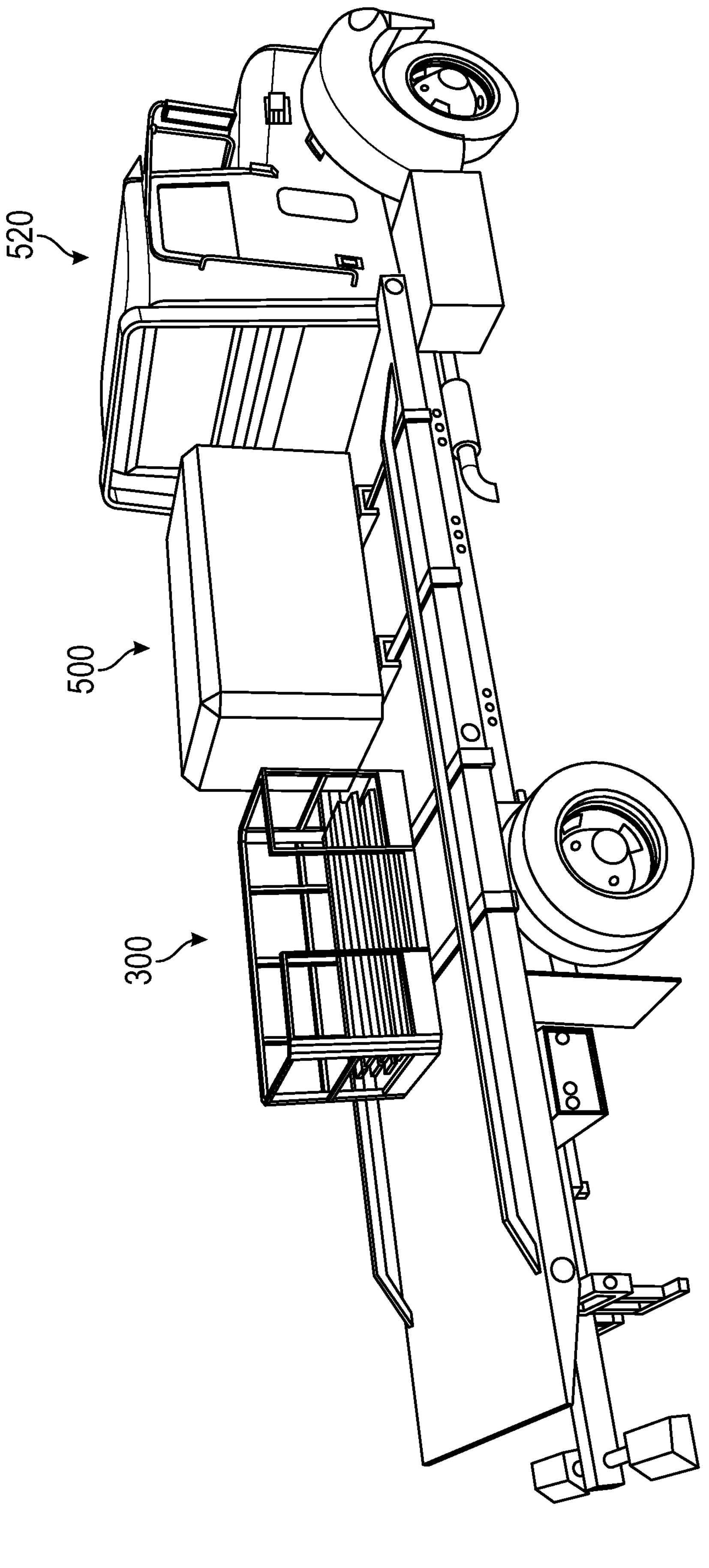
FIG. 17 is a perspective view of the secondary platform assemblies of FIG. 10 on a truck, with one of the secondary platform assemblies secured within the locker assembly of FIG. 16.

The use of removable secondary platform assemblies 300 with the primary platform assembly 16 also creates a variety of other opportunities to promote efficiency at a jobsite. For example, as depicted in FIGS. 16 and 17, the secondary platform assemblies 300 can be configured to be stored and transported using locker assemblies 500. The locker assemblies 500 generally include a base section 502, a rear wall 504, and two rotatable doors 506, 508 that can rotate about hinge joints on the rear wall 504 between an open position (shown in FIG. 16) and a closed position (shown in FIG. 17). Fork pockets 512 can be formed within an underside of the base section 502 to facilitate moving the locker assemblies 500 with a forklift or telehandler.

The locker assemblies 500 are configured to form a secure enclosure around tools and other valuables that may be left at a jobsite overnight. Similar to the coupling and decoupling processes described above, an operator can use the inputs on the control panels 214, 216, 218 to decouple a secondary platform assembly 300 from the primary platform assembly 16. In some examples, one or more of the control panels 214, 216, 218 can include an input for automatically positioning the secondary platform assembly 300 on the base section 502 using the sensors 226 described above. With the platform base 304 positioned on the base section 502, the primary platform assembly 16 can first be moved away using the lift assembly 14. Next, the doors 506, 508 can be rotated inward, about the hinge joints, until a secure enclosure is formed around the entire secondary platform assembly 300. In some examples, the doors 506, 508 include an interlocking feature 510 that can create a secure connection to store the secondary platform assembly 300. In other examples, the doors 506, 508 include overlapping tabs that are configured to receive a padlock for securing the locker assembly 500 in a closed position. In some examples, a keypad or code entry is positioned on one of the doors 506, 508, and automatically opens the doors 506, 508 upon receiving the correct code. Accordingly, the interlocking feature 510 may prevent opening of the doors 506, 508 unless a verified credential (e.g., a predetermined code, a physical key, etc.). Using one or more of the locking mechanisms described above, tools and other work materials can be easily and efficiently stored overnight and then readily accessed again the following day. While conventional systems may require tools to be moved from the platform each day, resulting in wasted time and extra labor, the locker assemblies 500 and removable secondary platform assemblies 300 provide a much faster and more efficient storage method.

The locker assemblies 500 also provide for efficient transport to and from jobsites. For example, and as depicted in FIG. 17, secondary platform assemblies 300 can be readily transported within the locker assemblies 500. This configuration can be particularly advantageous when tools or other valuable equipment is stored within the secondary platform assembly 300. Rather than expose these components to open air and risk wind damage or precipitation damage, and rather than going through a laborious process of putting away tools in other areas, the locker assemblies 500 can form an enclosure sufficient to protect the components within the secondary platform assembly 300. The locker assemblies 500 and secondary platform assemblies 300 can be positioned on the back of a flat bed (e.g., the truck 520) and hauled to various locations. Maintaining tool crates in their preferred conditions with tools in desired locations can save a significant amount of time at a jobsite.

Figure 18:
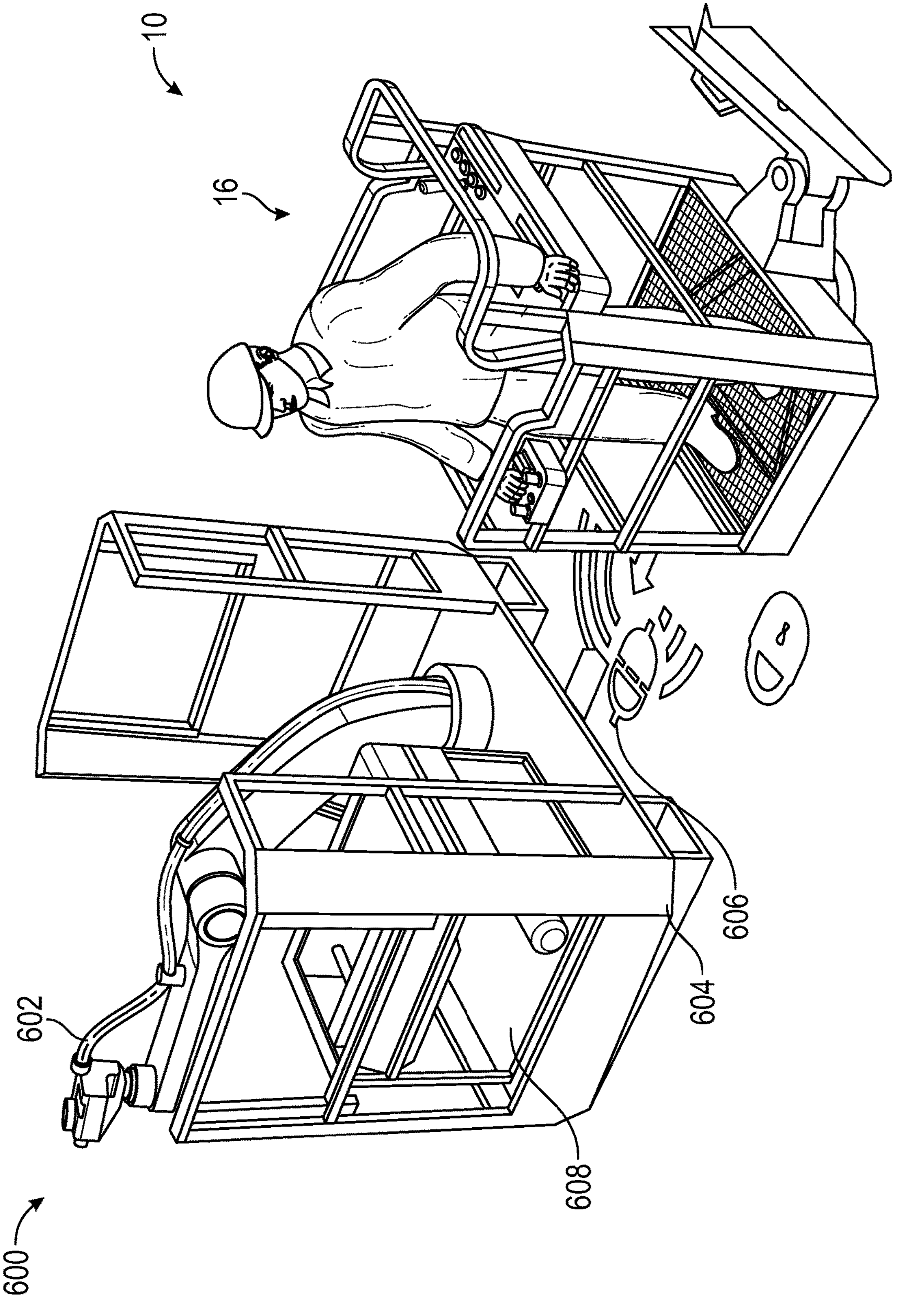
FIG. 18 is a perspective view of the primary platform assembly of FIG. 4 coupling with a secondary platform assembly shown as a tool kit.
Figure 19:
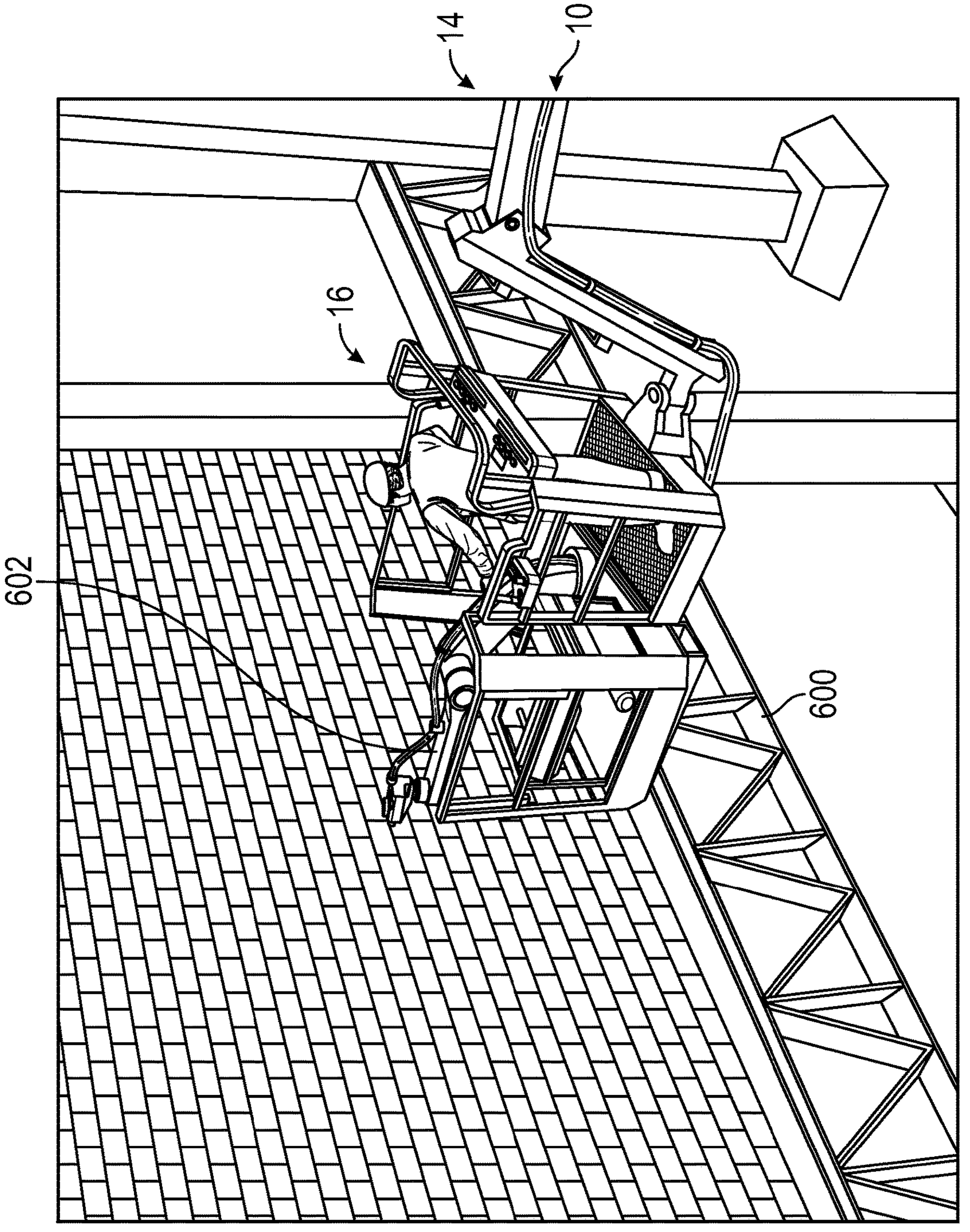
FIG. 19 is a perspective view of an operator on the primary platform assembly of FIG. 18 operating the boom lift to perform a task using the tool kit of FIG. 18.

In some examples, and as shown in FIGS. 18 and 19, the secondary platform assemblies 300 can be formed as job-specific boom end tools. Various different types of implements (e.g., tools) can be packaged into compatible platform structures similar to the secondary platform assemblies 300 shown above. In some embodiments, the robotic secondary platform assembly 600 is formed as a brick-cleaning device. Alternatively, a welding unit can be positioned within the robotic platform assembly 600. In still other examples, the robotic secondary platform assembly 600 can be formed as torqueing device (e.g., with a drill or other tool). The robotic secondary platform assembly 600 generally includes a robotic arm 602 that is configured to be controlled either autonomously or by one or more of the control panels 214, 216, 218. The incorporation of the auxiliary control panels 216, 218 can allow for a user to control and position the boom 10 while facing the task to be performed, which can provide greater accuracy and efficiency when performing a task.

Like the secondary platform assemblies 300 discussed above, the robotic secondary platform assembly 600 is hot-swappable and readily exchangeable with the primary platform assembly. As depicted in FIG. 18, the same coupling process can be initiated, where the sensors 226 and controllers 228 automatically position the primary platform assembly 16 relative to the robotic secondary platform assembly 600. The arms from the locking mechanism 240 can engage a base panel 604 of the robotic secondary platform assembly 600 to create a removable coupling. In some examples, the robotic secondary platform assembly 600 further includes a terminal 606 or electrical connector extending outwardly from the base panel 604. The terminal 606 can be configured to make an electrical coupling with a similarly exposed terminal on the primary platform assembly 16. When the arms from the locking mechanism 240 engage the robotic secondary platform assembly 600, the positioning is such that the terminal 606 and the corresponding terminal on the primary platform assembly 16 engage, creating electrical communication between a battery or power storage device on the boom 10 and the electronic components on the robotic secondary platform assembly 600. Accordingly, the robotic arm 602 and associated tools can be powered by the on-board battery of the boom. In other examples, the robotic secondary platform assemblies are supplied with their own on-board power source (e.g., a battery 608). Accordingly, the electrical communication between the terminals 606 and those on the primary platform assembly 16 can be data terminals, allowing the control panels 214, 216, 218 to interact with and otherwise control certain functions of the robotic arm 602 and associate equipment. In still other examples, the robotic secondary platform assembly can include a hydraulic connector (e.g., a hydraulics link) which can be used to incorporate the robotic secondary platform assembly into the hydraulic circuit of the boom 10 to perform different functions.

Referring now to FIGS. 20-33, the use of selectively coupled secondary platform assemblies 300 allows for platform customization that is not otherwise available to a user. By having machines that can readily couple and decouple with platforms to perform tasks, a customized platform building function can then be used by a customer to build and obtain secondary platform assemblies 300 built for the customer's known uses, such that the customer can have its own platform assemblies while continuing to rent, rather than own a boom 10. The customization process can occur using a platform builder, such as the platform building tool 700 disclosed in FIGS. 20-33. The platform building tool 700 may provide a graphical user interface (GUI) for representation on a user device (e.g., a smartphone, a tablet, a personal computer, etc.). The GUI may provide a three-dimensional representation of the secondary platform assembly 300 with various customization options, as selected by a user. The platform building tool 700 may be stored locally on the user device or accessed from a remote device (e.g., a server).

Figure 20:
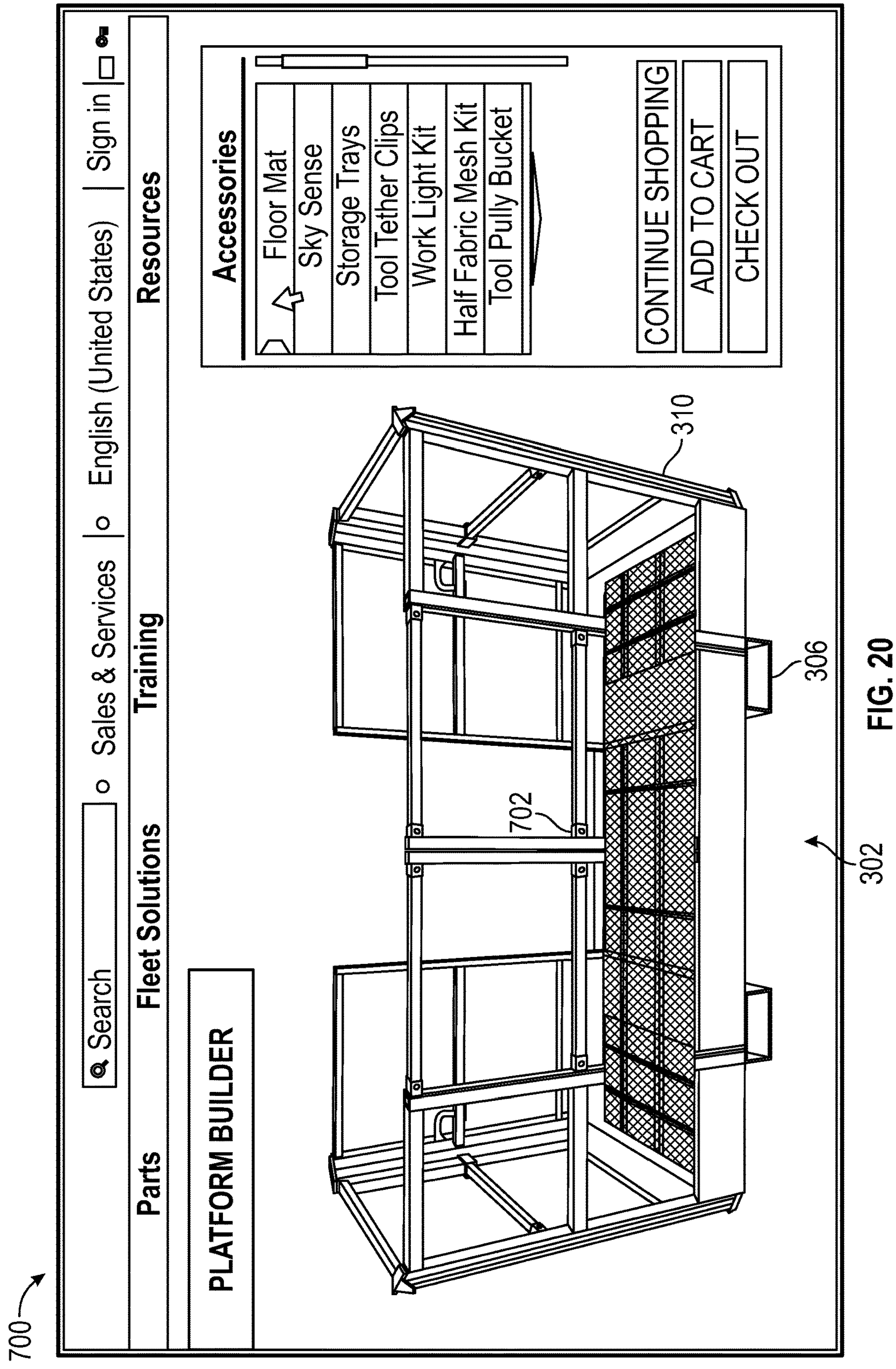
FIGS. 20-33 are screenshots of a graphical user interface that can be used to create a customized secondary platform assembly for use with the primary platform assembly of FIG. 4.

The platform building tool 700 can begin with a basic steel platform 702, shown in FIG. 20. The basic steel platform 702 includes, among other things, the coupling area 302 that is configured to interface with the locking mechanism 240. The basic platform 702 further includes fork pockets 306 and a rail assembly 310. The interface includes a variety of different accessory options that a user can select to customize the platform 702.

Figure 21:
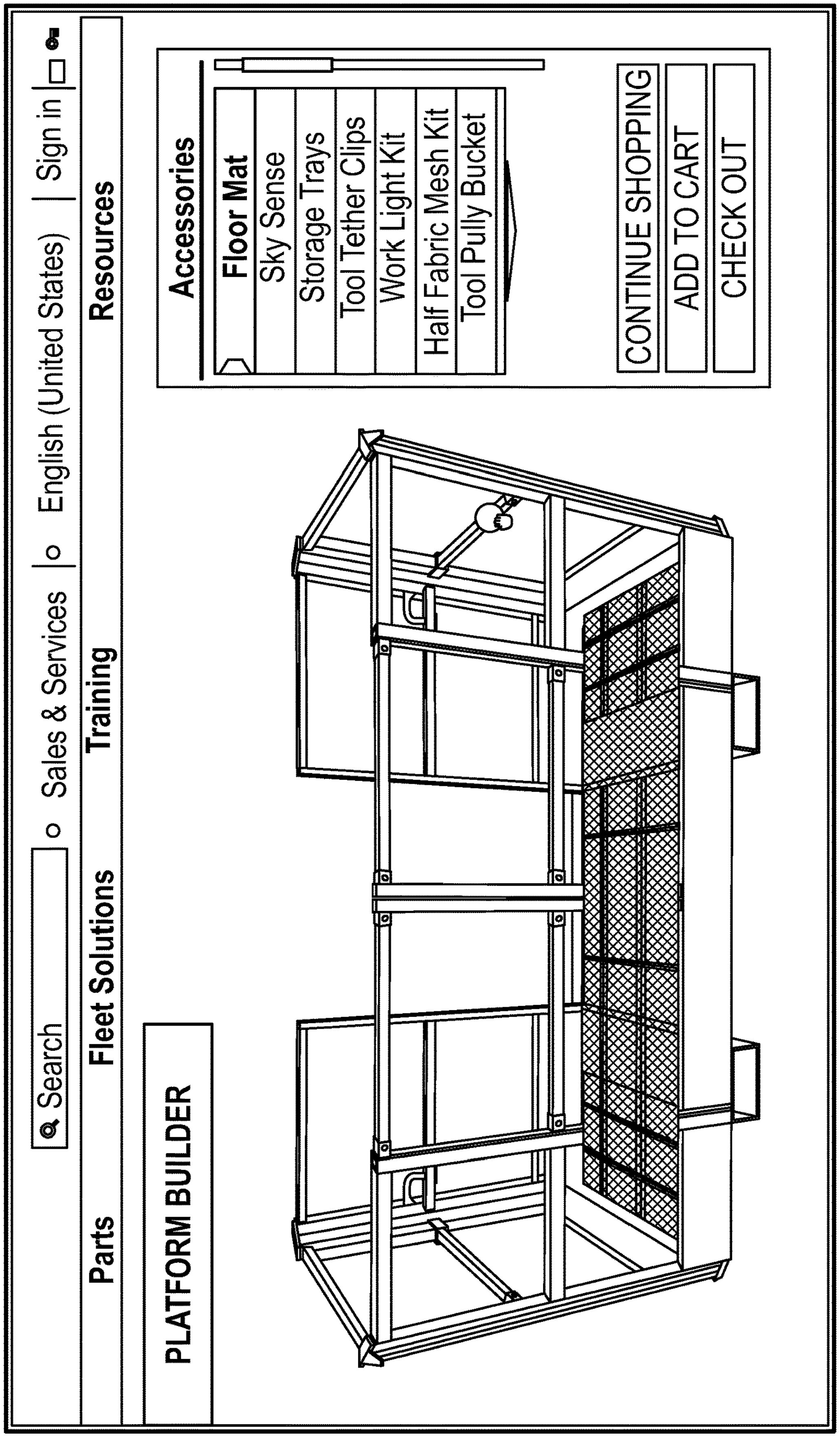
Figure 22:
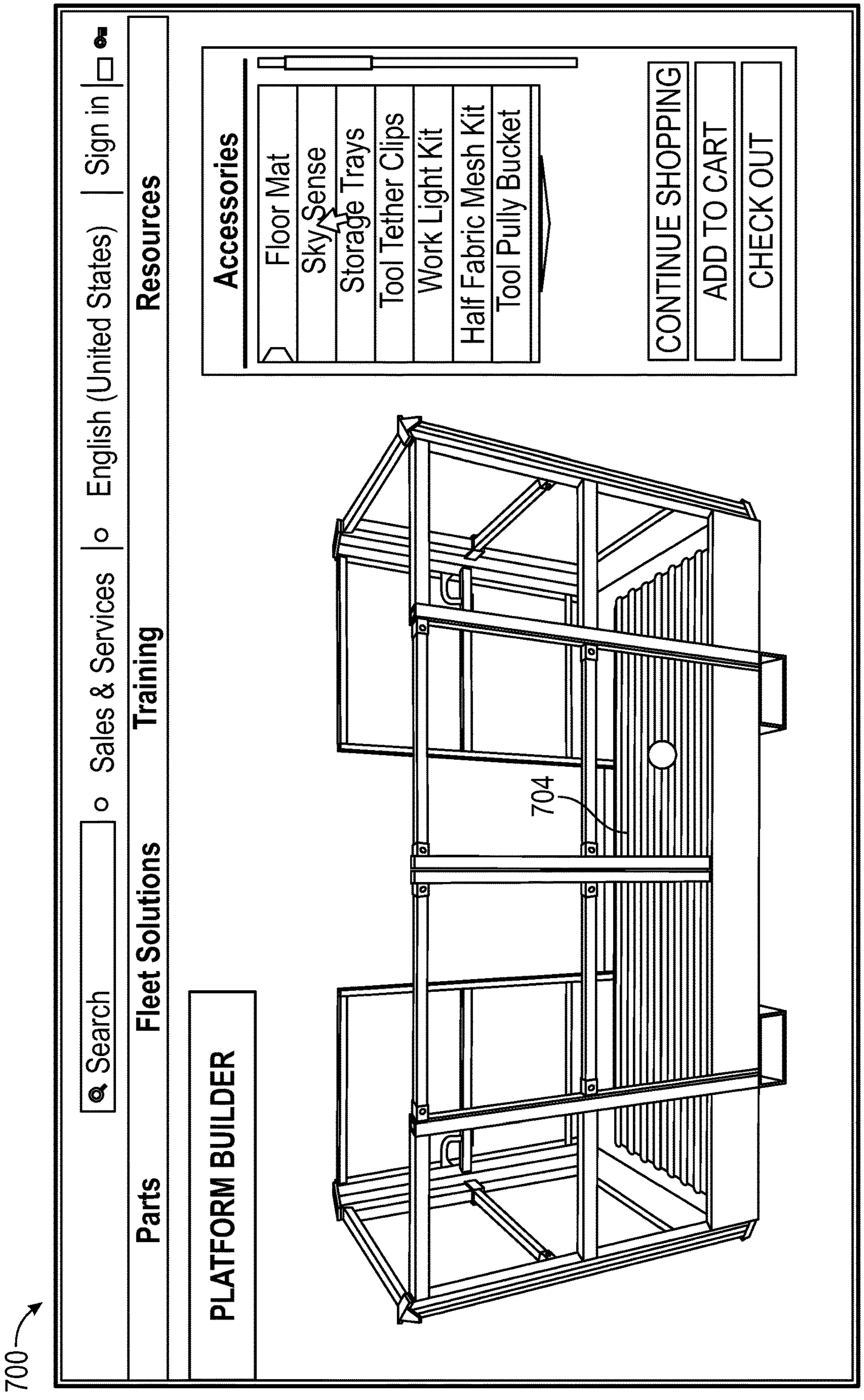
Figure 23:
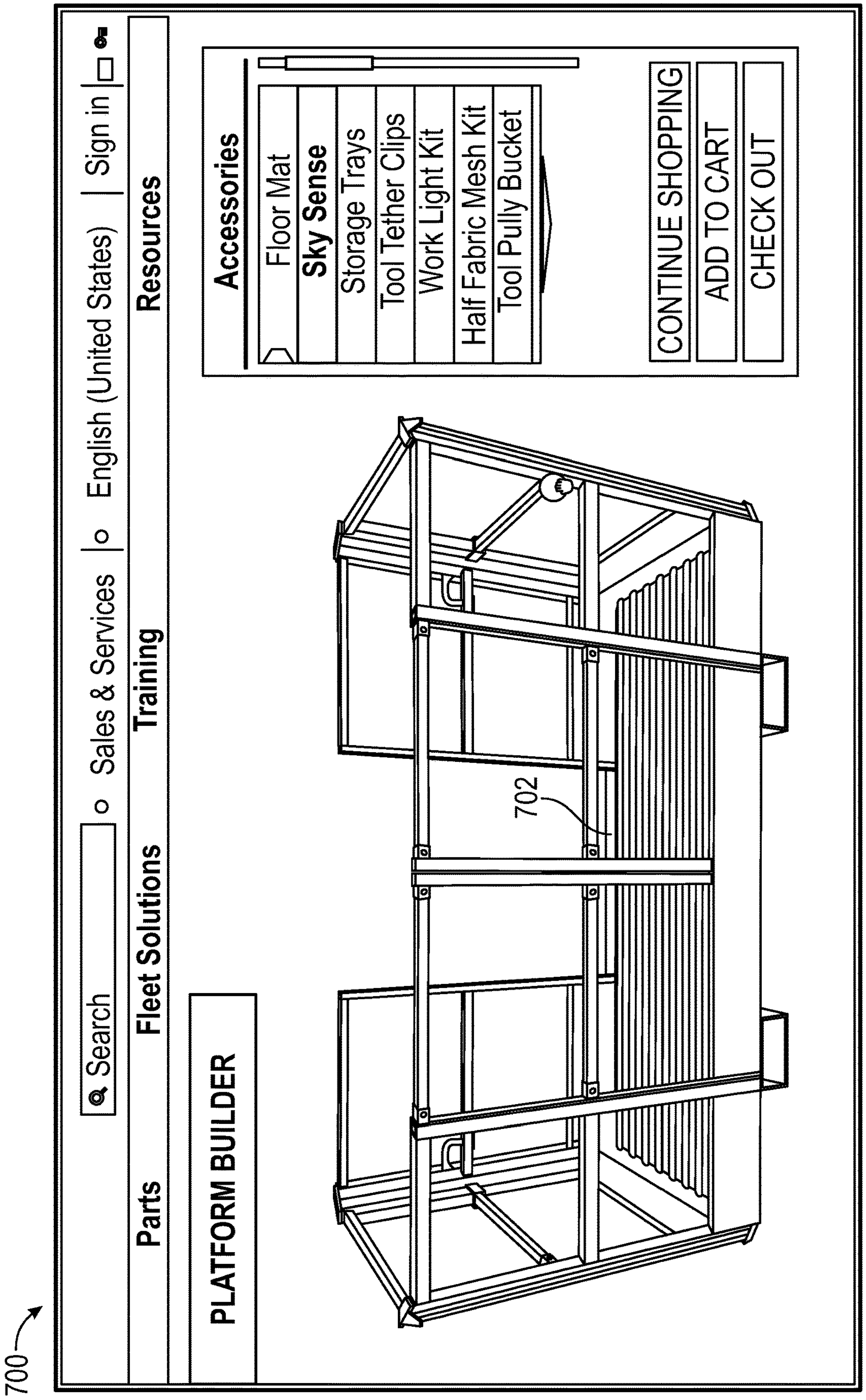
Figure 24:
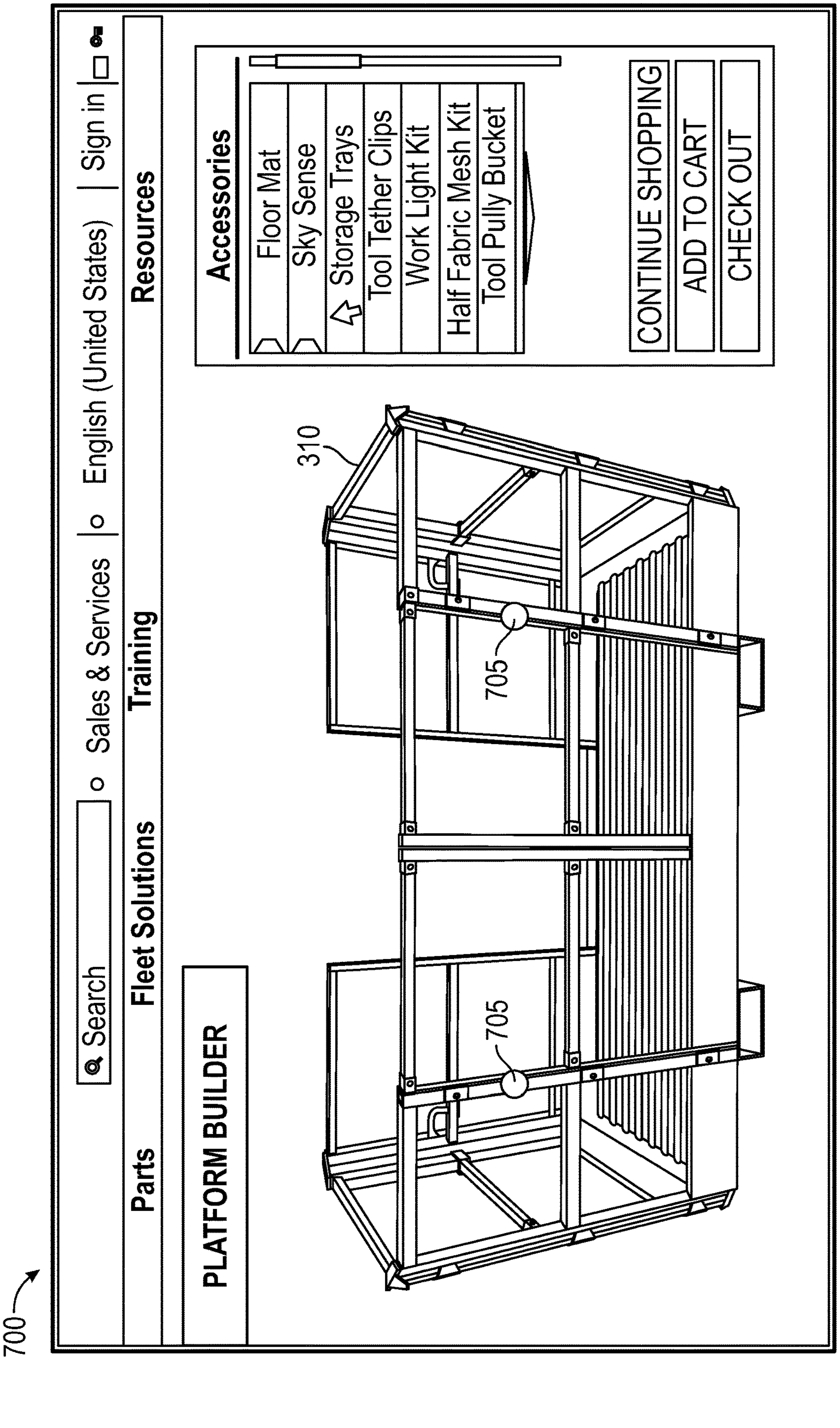
Figure 25:
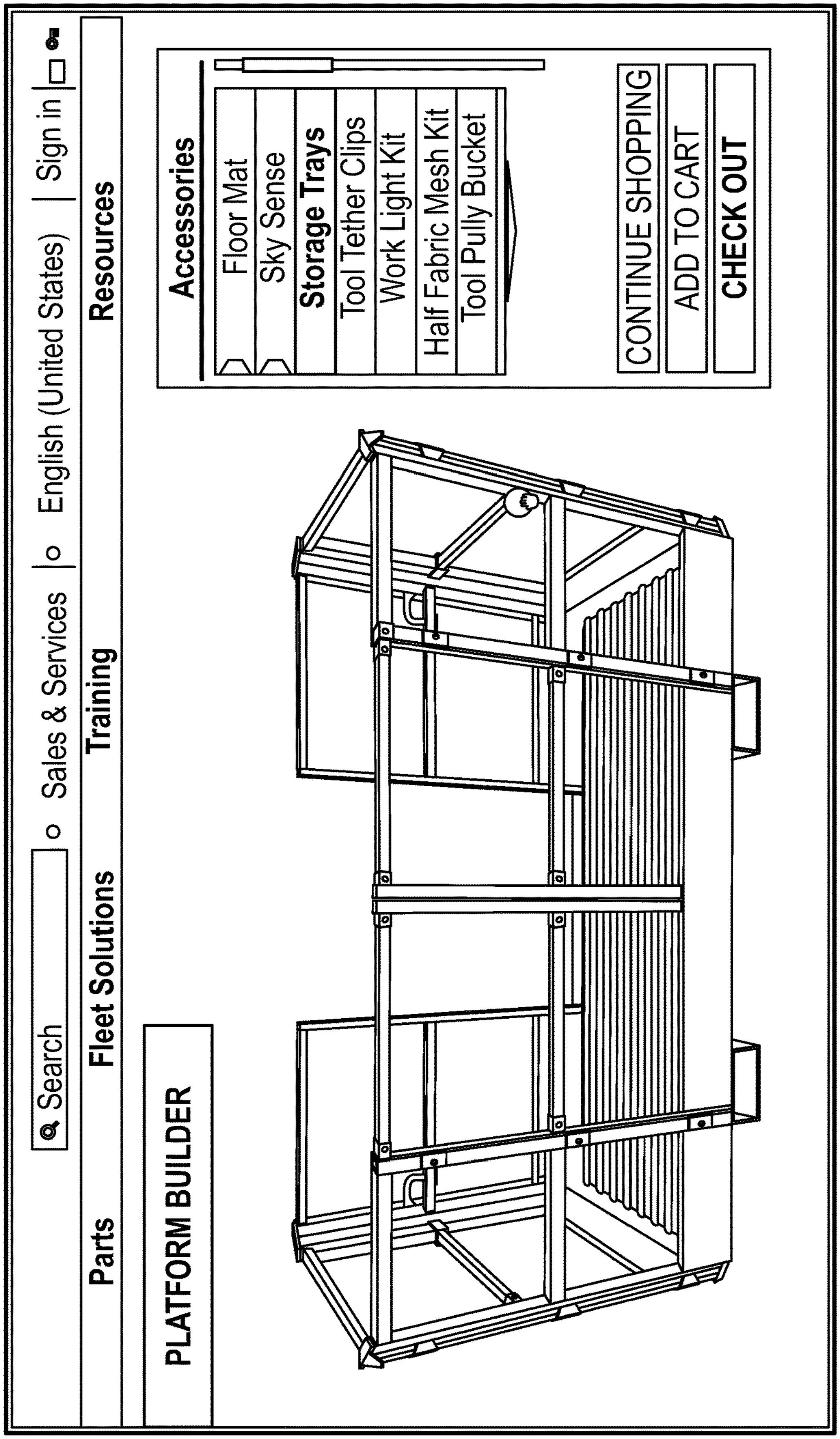
Figure 26:
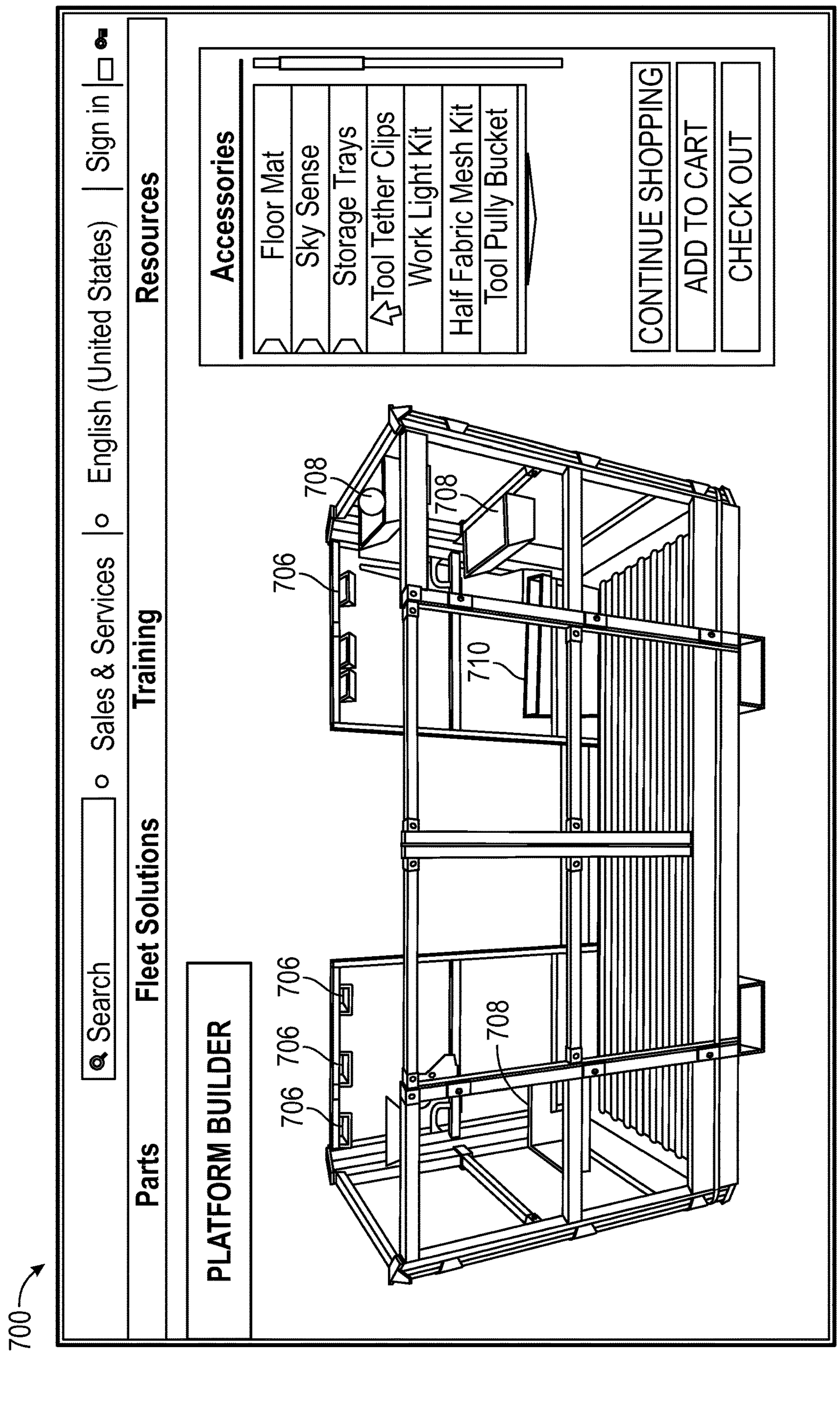
Figure 27:
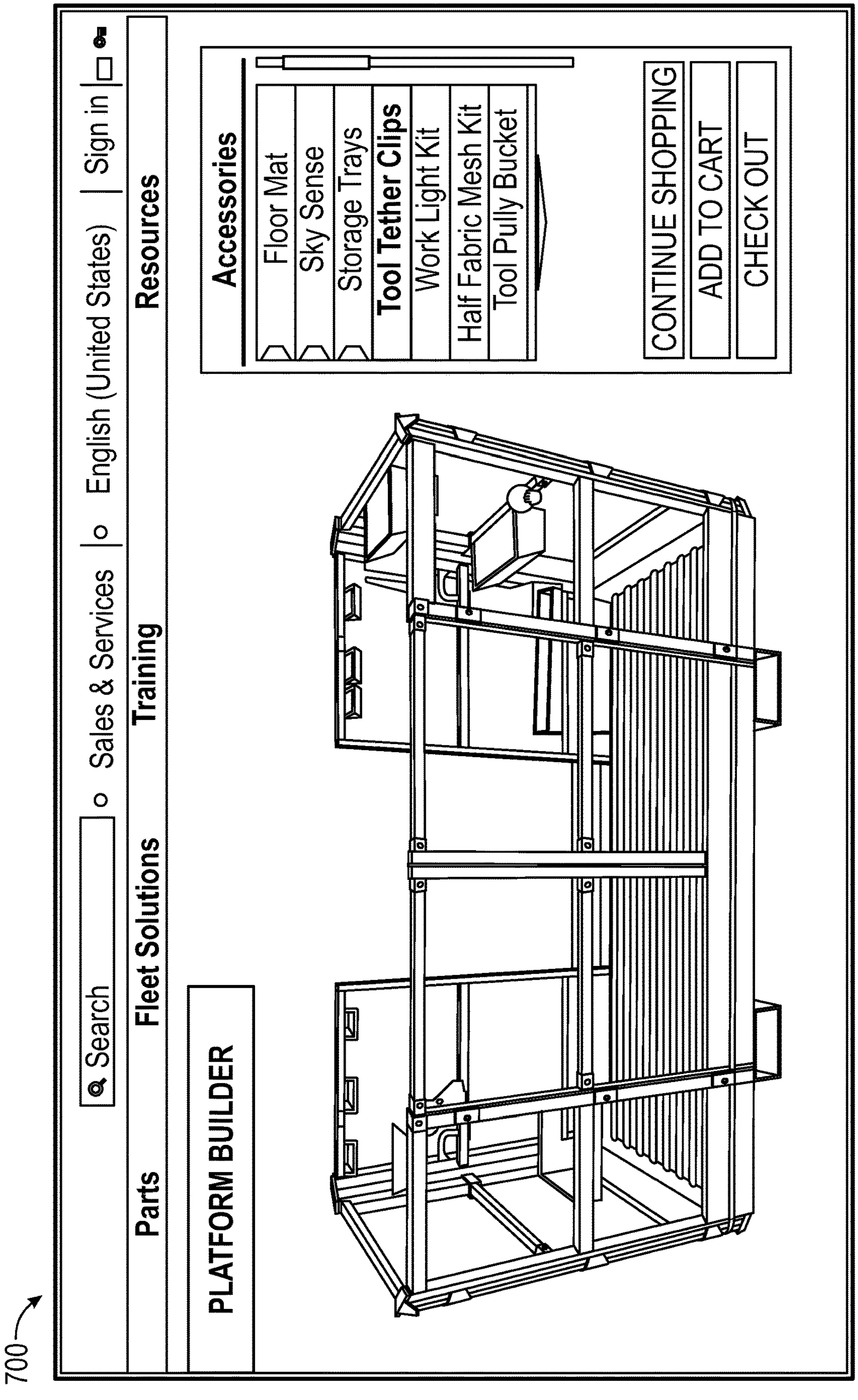
Figure 28:
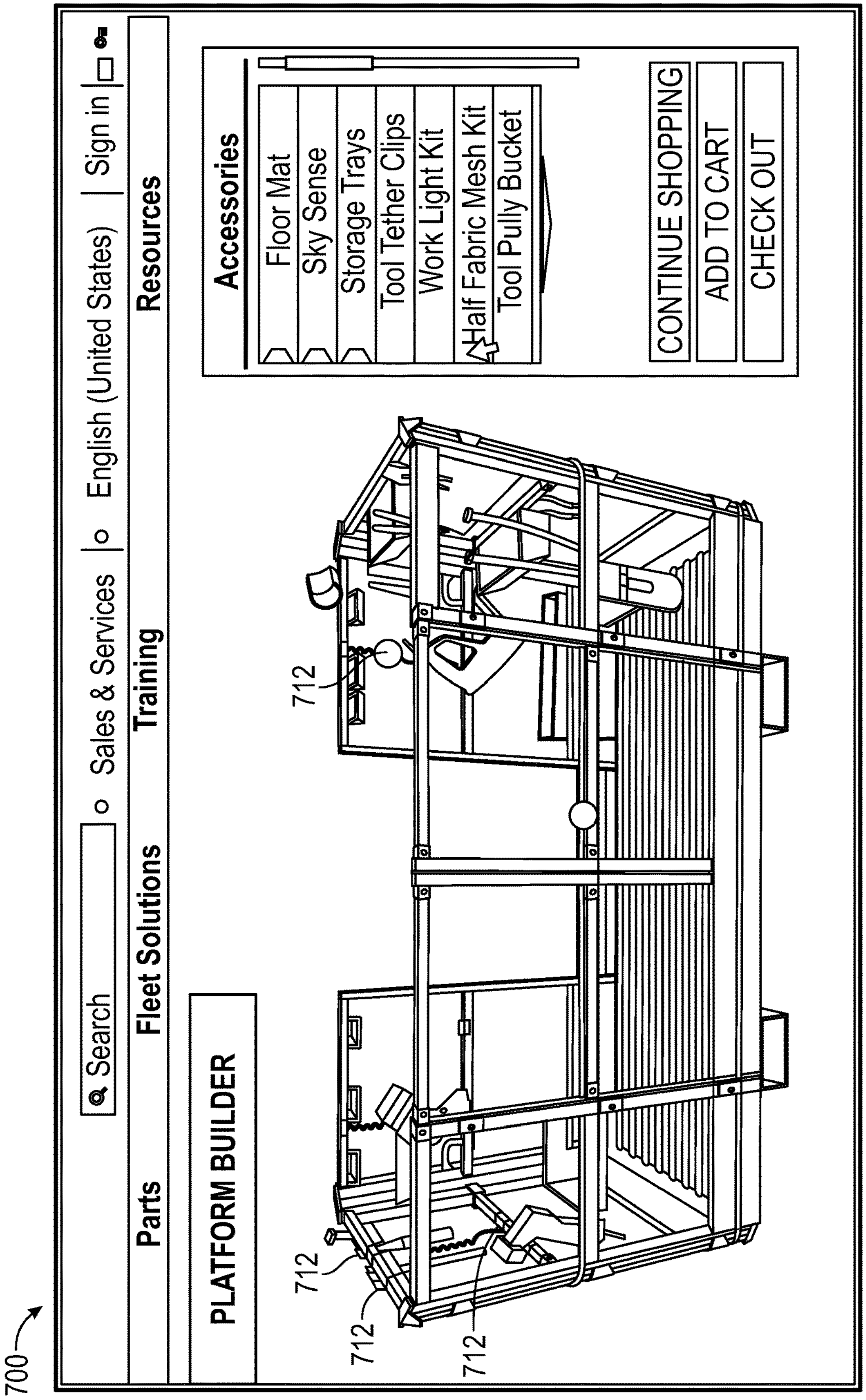
Figure 29:
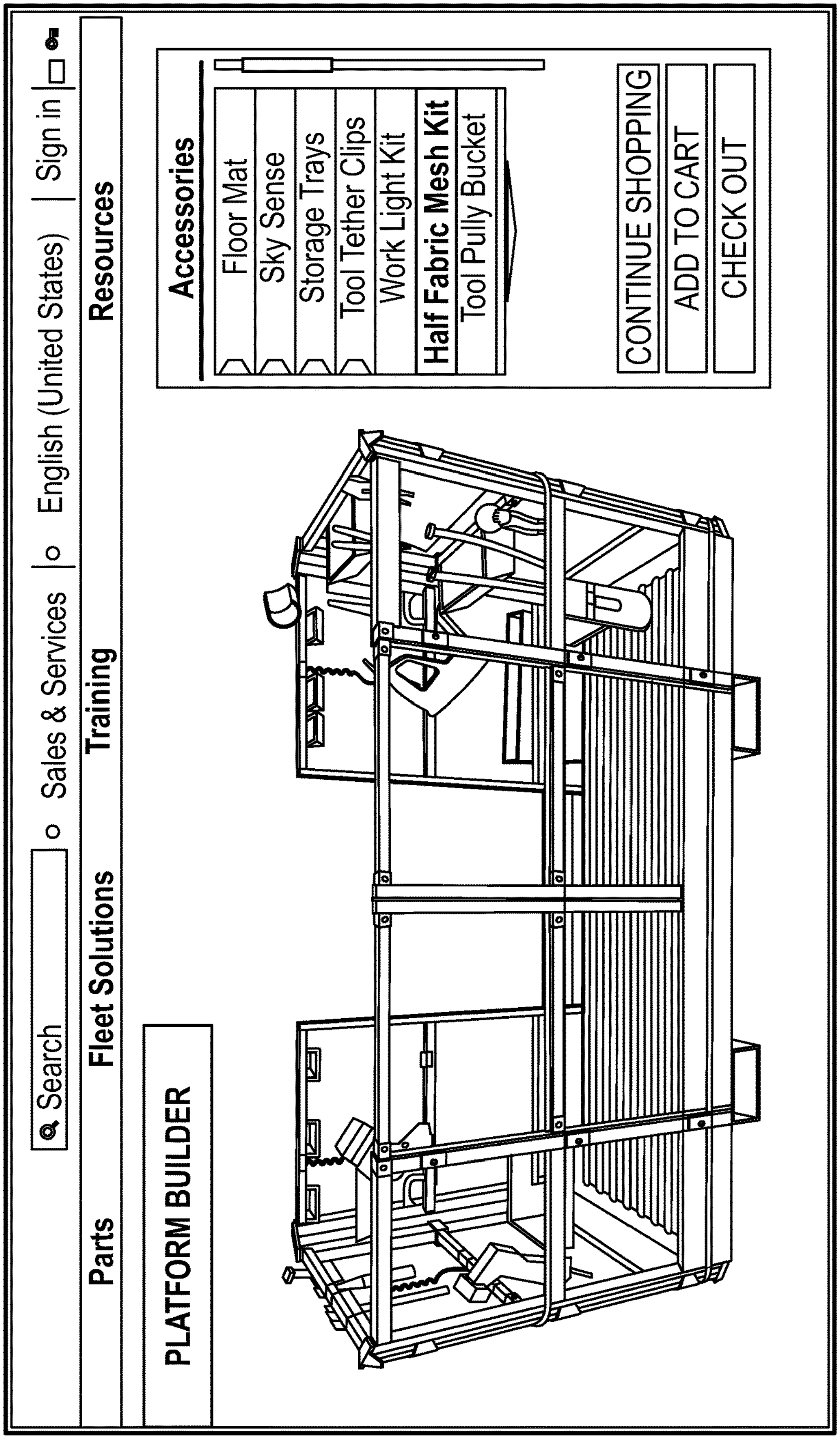
Figure 30:
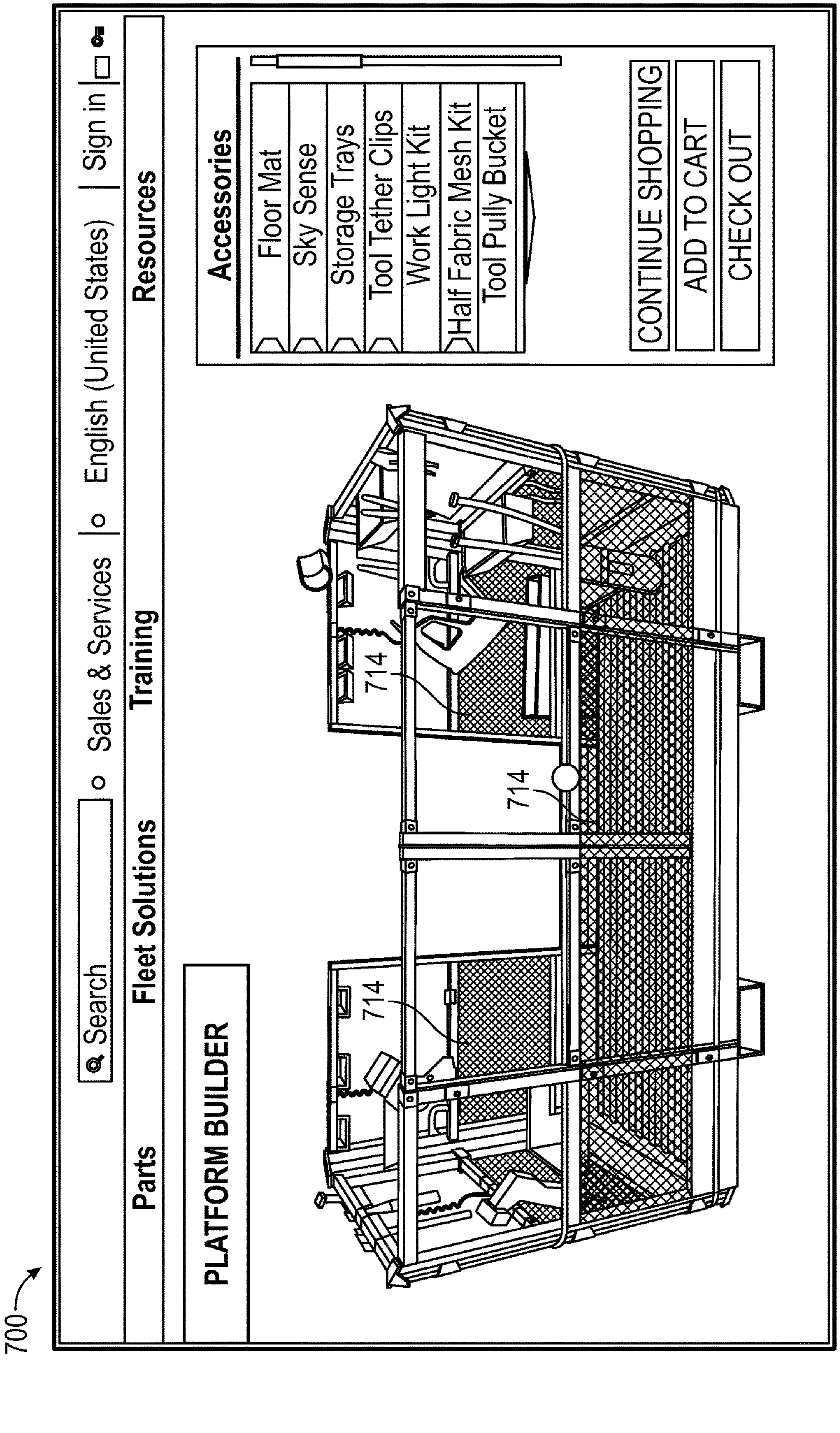
Figure 31:
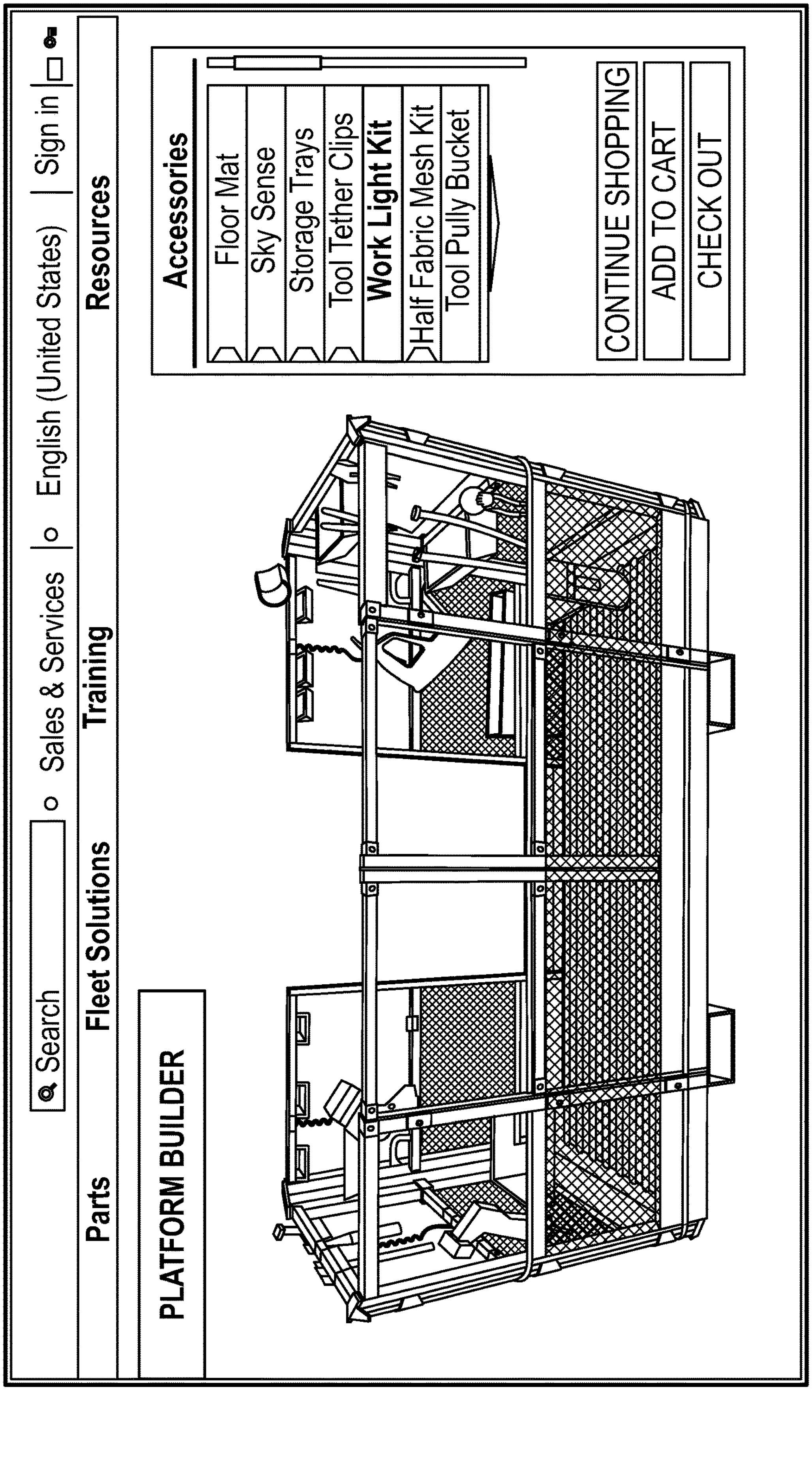
Figure 32:
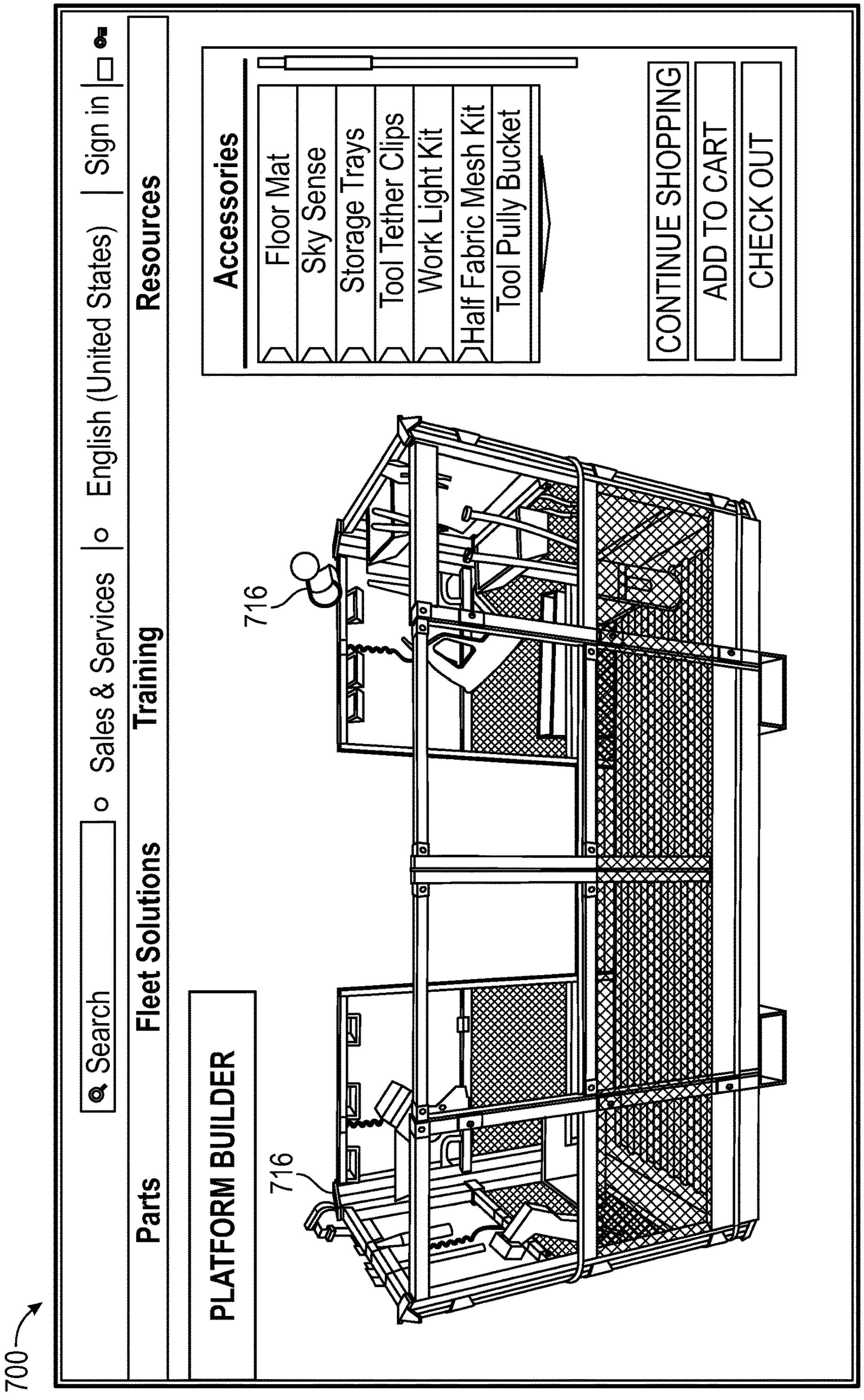
Figure 33:
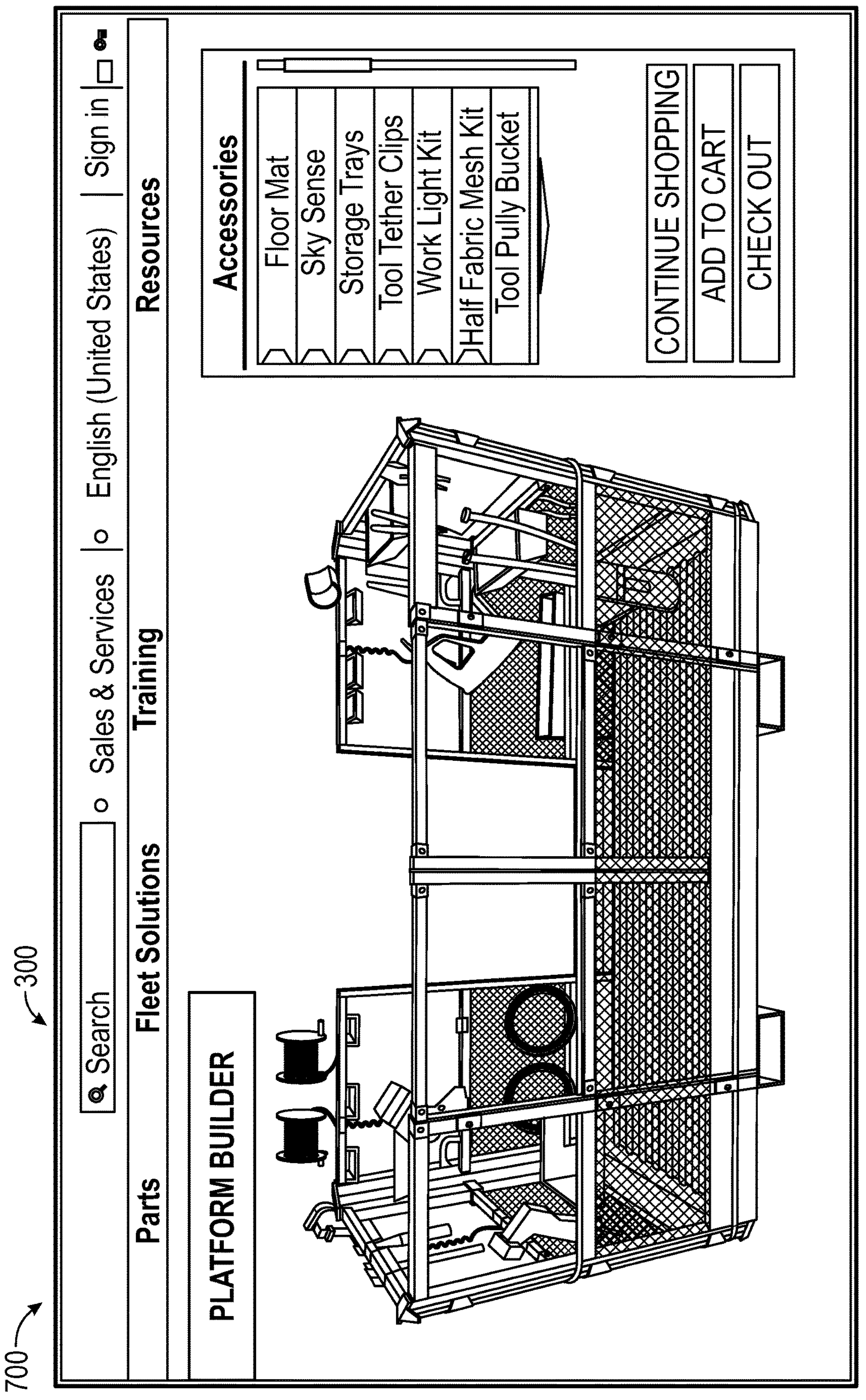

As depicted in FIGS. 21 and 22, a variety of different floor mats 704 can be chosen from. In some examples, a user selects a mesh grate floor mat 704. The interface can show a preview of the selected floor mat 704 on the platform 702 to help a user envision the finalized product. As depicted in FIGS. 23 and 24, SkySense® can be selected. If SkySense® is selected, a number of sensors 705 (e.g., cameras, LIDAR sensors, contact sensors, etc.) can be included onto the rail assembly 310. As depicted in FIGS. 25 and 26, a user can select from a variety of different storage tray options. The storage trays 706, 708, 710 can provide a variety of different tool or equipment storage, and can be individually selected by a user. As depicted in FIGS. 27 and 28, tool tether clips can be selected for inclusion into the platform 702. The tool tether clips 712 can include attachments for removably coupling various power tools and hand tools to the rail assembly 301 to facilitate storage and access. Referring to FIGS. 29 and 30, fabric mesh kits can be selected for inclusion onto the platform 702. The fabric mesh kits 714 can include half fabric mesh on certain elements of the rail assembly 310. As depicted in FIGS. 31 and 32, various work light kits can be selected for inclusion onto the platform 702. The work light kits can include lights 716 that are mounted to the rail assembly 310 to help workers in lower light situations. As depicted in FIG. 33, the interface can then include an overall preview for the purchased secondary platform assembly 300, which can then be manufactured and custom-built according to a customer's exact specifications.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms “approximately”, “about”, “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term “exemplary” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” “between,” etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the lift device as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A lift device comprising:

a chassis;

a primary platform including:

a base defining a first support surface configured to support an operator;

a guardrail coupled to the base and extending above the first support surface, the guardrail including a rear wall and a pair of sidewalls extending forward from the rear wall; and a door coupled to the guardrail and extending between the sidewalls;

a lift assembly coupling the primary platform to the chassis and configured to raise the primary platform relative to the chassis;

a secondary platform defining a second support surface and removably coupled to the primary platform;

an actuator configured to reposition the primary platform;

a first user interface coupled to the rear wall and configured to control operation of the actuator; and a second user interface coupled to one of the sidewalls and configured to control the operation of the actuator.

2. The lift device of claim 1, wherein the guardrail defines an opening through which the first support surface can be accessed.

3. The lift device of claim 2, wherein the door is repositionable between (a) a closed position in which the door extends across the opening to limit movement of the operator through the opening and (b) an open position in which the door is moved away from the opening.

4. The lift device of claim 2, wherein the base is a first base, the guardrail is a first guardrail, and the opening is a first opening;

wherein the secondary platform includes a second base defining the second support surface and a second guardrail coupled to the second base and extending above the second support surface, the second guardrail defining a second opening; and wherein, when the secondary platform is coupled to the primary platform, a path is formed for the operator to pass between the first support surface and the second support surface through the first opening and the second opening.

5. The lift device of claim 4, wherein an area of the second support surface is larger than an area of the first support surface.

6. The lift device of claim 4, wherein, when the secondary platform is coupled to the primary platform, the first support surface and the second support surface are substantially coplanar.

7. The lift device of claim 1, wherein the secondary platform defines a passage below the second support surface and extending longitudinally at least partway through the secondary platform.

8. The lift device of claim 7, further comprising an electrical connector coupled to the secondary platform and positioned to electrically couple the secondary platform to the primary platform when the secondary platform is coupled to the primary platform.

9. The lift device of claim 1, wherein the actuator is configured to at least one of (a) drive a tractive element to propel the chassis or (b) actuate the lift assembly to move the primary platform relative to the chassis.

10. The lift device of claim 1, further comprising:

a sensor configured to provide sensor data indicating a position of the secondary platform relative to the primary platform; and a controller operatively coupled to the actuator and the sensor and configured to control the actuator to move the primary platform toward the secondary platform based on the sensor data.

11. The lift device of claim 1, wherein the secondary platform includes a connector configured to electrically couple the secondary platform to the primary platform.

12. The lift device of claim 11, wherein the secondary platform is a first secondary platform, the base is a first base, and the guardrail is a first guardrail, further comprising a second secondary platform including a second base defining a third support surface and a second guardrail extending above the third support surface, wherein the second secondary platform is configured to be coupled to the primary platform when the first secondary platform is removed.

13. The lift device of claim 1, further comprising:

a lanyard configured to couple an operator harness to the primary platform;

a sensor coupled to the lanyard and configured to provide sensor data relating to movement of the lanyard relative to the primary platform; and a controller operatively coupled to the sensor and the actuator and configured to control the actuator to move the primary platform based on the sensor data.

14. The lift device of claim 1, further comprising a locker assembly configured to contain the secondary platform, the locker assembly comprising:

a base panel;

a rear panel coupled to the base panel; and a pair of door panels pivotally coupled to the rear panel and each rotatable relative to the rear panel between an open position and a closed position, wherein when the door panels are in the closed positions, the door panels, the rear panel, and the base panel form an enclosure sized to contain the secondary platform.

15. A lift device comprising:

a chassis;

a primary platform defining a first support surface configured to support an operator;

a lift assembly coupling the primary platform to the chassis and configured to raise the primary platform relative to the chassis;

a secondary platform defining a second support surface and removably coupled to the primary platform; and a locker assembly configured to contain the secondary platform, the locker assembly comprising:

a base panel;

a rear panel coupled to the base panel; and a pair of door panels pivotally coupled to the rear panel and each rotatable relative to the rear panel between an open position and a closed position, wherein when the door panels are in the closed positions, the door panels, the rear panel, and the base panel form an enclosure sized to contain the secondary platform.

* * * * *